US012225653B2

(12) United States Patent
Itakura et al.

(10) Patent No.: US 12,225,653 B2
(45) Date of Patent: Feb. 11, 2025

(54) HEATING DEVICE

(71) Applicant: Mitsubishi Electric Corporation, Tokyo (JP)

(72) Inventors: Hiroshi Itakura, Tokyo (JP); Takeshi Oshima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 683 days.

(21) Appl. No.: 17/468,788

(22) Filed: Sep. 8, 2021

(65) Prior Publication Data

US 2021/0410241 A1 Dec. 30, 2021

Related U.S. Application Data

(63) Continuation of application No. PCT/JP2019/015990, filed on Apr. 12, 2019.

(51) Int. Cl.
*H05B 6/68* (2006.01)
*H05B 6/66* (2006.01)
*H05B 6/72* (2006.01)

(52) U.S. Cl.
CPC ............. *H05B 6/686* (2013.01); *H05B 6/664* (2013.01); *H05B 6/72* (2013.01); *H05B 2206/044* (2013.01)

(58) Field of Classification Search
CPC ....................... H05B 2206/044; H05B 6/6482; H05B 6/664; H05B 6/686; H05B 6/72
USPC ........ 219/764, 770, 771, 778, 780, 716, 761
See application file for complete search history.

(56) References Cited

U.S. PATENT DOCUMENTS

2010/0176121 A1* 7/2010 Nobue .................. H05B 6/686 219/716
2010/0176123 A1* 7/2010 Mihara .................. H05B 6/705 219/746
2018/0098390 A1 4/2018 Yagishita et al.

FOREIGN PATENT DOCUMENTS

| | | | |
|---|---|---|---|
| JP | 50-22536 | U | 3/1975 |
| JP | 55-104297 | U | 7/1980 |
| JP | 56-49093 | U | 5/1981 |
| JP | 7-130463 | A | 5/1995 |
| JP | 2001-148283 | A | 5/2001 |
| JP | 2002-39540 | A | 2/2002 |
| JP | 2010-267566 | A | 11/2010 |
| JP | 2018-60598 | A | 4/2018 |

OTHER PUBLICATIONS

Japanese Office Action for Japanese Application No. 2021-513139, dated Jun. 21, 2022, with English translation.

(Continued)

*Primary Examiner* — Quang T Van
(74) *Attorney, Agent, or Firm* — Birch, Stewart, Kolasch & Birch, LLP

(57) ABSTRACT

The microwave power is distributed to microwave radiation elements arranged rotationally symmetrically around a reference line on a plane on a top face side of a heating chamber by advancing a feeding phase with a phase difference of 360°/2N clockwise or counterclockwise in turn.

4 Claims, 15 Drawing Sheets

(56) References Cited

OTHER PUBLICATIONS

Chinese Office Action and Search Report for Chinese Application No. 201980094880.4, dated Jan. 27, 2024, with English translation.
International Search Report, issued in PCT/JP2019/015990, dated Jul. 16, 2019.
Chinese Office Action and Search Report for Chinese Application No. 201980094880.4, dated Jul. 7, 2024, with English translation.

* cited by examiner

HEATING DEVICE

CROSS REFERENCE TO RELATED APPLICATIONS

This application is a Continuation of PCT International Application No. PCT/JP2019/015990, filed on Apr. 12, 2019, which is hereby expressly incorporated by reference into the present application.

TECHNICAL FIELD

The present invention relates to a heating device that heats an object to be heated using an electromagnetic wave.

BACKGROUND ART

A heating device that heats an object to be heated using an electromagnetic wave has an advantage that the object to be heated can be heated in a short time, but also has a disadvantage that uneven heating occurs in the object to be heated. For example, in a heating device, since the inside of a heating chamber is an electrically closed space, due to the nature of an electromagnetic wave, a standing wave of a microwave (2.45 GHz) emitted into the heating chamber is generated, so that uneven heating occurs in an object to be heated.

As a conventional technique for solving this problem, for example, there is a heating device described in Patent Literature 1. In this heating device, an intensity distribution of a heating amount necessary for an object to be heated is detected, and an output of a microwave is controlled in accordance with the detected intensity distribution. In this technique, occurrence of uneven heating in the object to be heated is suppressed.

CITATION LIST

Patent Literatures

Patent Literature 1: JP 2018-060598A

SUMMARY OF INVENTION

Technical Problem

The heating device described in Patent Literature 1 changes a heating intensity distribution in a heating chamber, but does not solve the problem of uneven heating caused by a standing wave of a microwave generated in the heating chamber. Therefore, there is still a problem that uneven heating due to a standing wave of a microwave in the heating chamber occurs.

The present invention has been made to solve the above problem, and has an object to obtain a heating device capable of suppressing occurrence of uneven heating in an object to be heated.

Solution to Problem

A heating device according to the present invention includes a heating chamber in which an object to be heated is housed; a power generation unit generating microwave power; a power distribution unit distributing the microwave power generated by the power generation unit into a plurality of microwave powers; and a plurality of pairs of microwave radiation elements arranged on at least one plane orthogonal to a reference line set in the heating chamber, the plurality of pairs of microwave radiation elements each including two microwave radiation elements being arranged on opposite sides with respect to an intersection point between the reference line and the at least one plane. The power distribution unit distributes the plurality of microwave powers to a plurality of microwave radiation elements included in the plurality of pairs of microwave radiation elements by setting a phase difference of an angle obtained by dividing 360° by the number of the plurality of the microwave radiation elements clockwise or counterclockwise in turn around the reference line.

Advantageous Effects of Invention

According to the present invention, a plurality of pairs of microwave radiation elements arranged on at least one plane orthogonal to a reference line set in the heating chamber, the pairs of microwave radiation elements each including two microwave radiation elements facing each other across an intersection point between the reference line and the plane are provided. The microwave power is distributed to a plurality of the microwave radiation elements constituting the plurality of pairs of microwave radiation elements by setting a phase difference of an angle obtained by dividing 360° by the number of a plurality of the microwave radiation elements clockwise or counterclockwise in turn around the reference line. For example, when there are two pairs of microwave radiation elements, a phase difference of 90° is set clockwise or counterclockwise in turn around the reference line, and the microwave powers are distributed to the four microwave radiation elements constituting these pairs. As a result, an electric field mode in which the electric field in the heating chamber rotates in time is obtained. As the electric field mode rotates, a wide range heating distribution is achieved for the object to be heated, so that uneven heating in the object to be heated can be suppressed.

DESCRIPTION OF EMBODIMENTS

First Embodiment

Figure 1:
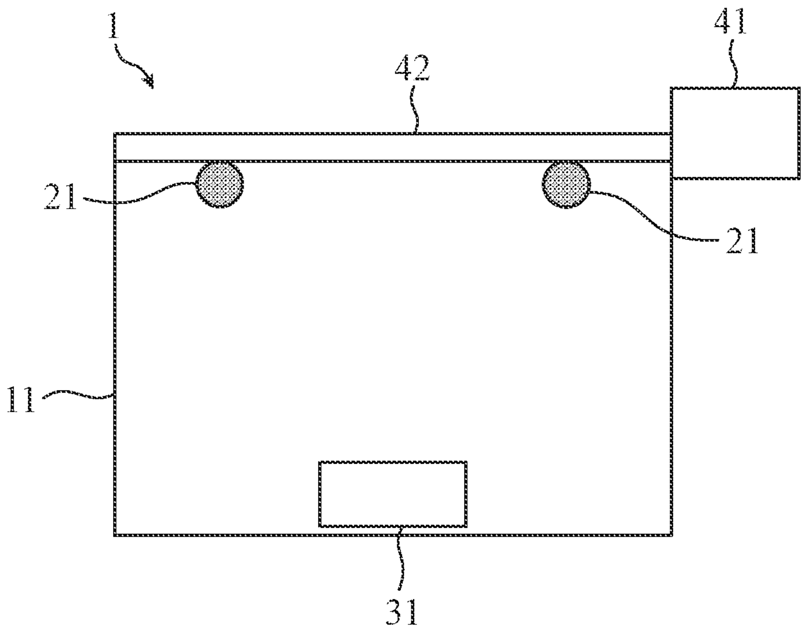
FIG. 1 is a schematic view illustrating an outline of a configuration of a heating device according to a first embodiment.

FIG. 1 is a schematic view illustrating an outline of a configuration of a heating device 1 according to the first embodiment. In order to visually recognize microwave radiation elements 21*a* to 21*d* and an object to be heated 31 inside a heating chamber 11, the walls of the heating chamber 11 are drawn to be transparent. The heating device 1 includes a heating chamber 11, a plurality of microwave radiation elements 21, a power generation device 41, and a power distribution circuit 42. The object to be heated 31 is housed in the heating chamber 11. The heating chamber 11 is configured such that, for example, its wall surfaces other than the wall surface on which a heating chamber door is provided is formed of a metal shielding plate. The heating chamber door is provided with an electromagnetic wave shielding structure. Thus, the heating chamber 11 forms an electrically closed space in which microwaves are confined.

The power generation device 41 is a power generation unit for generating microwave power. For example, the power generation device 41 is an oscillation unit for generating microwave power by being supplied with a voltage signal set to a microwave (2.45 GHz) frequency and oscillating. The power distribution circuit 42 is a power distribution unit for dividing the microwave power generated by the power generation device 41 into a plurality of microwave powers, and distributing the microwave powers into a plurality of microwave radiation elements 21 at different phases (feeding phases).

In the heating device 1, each two of the plurality of microwave radiation elements 21 are set as one pair, and the heating chamber 11 is provided with a plurality of pairs. That is, when the number of pairs is represented by a natural number N equal to or greater than two, the heating device 1 includes 2N microwave radiation elements 21. The microwave radiation element 21 radiates (feeds) the microwave power distributed by the power distribution circuit 42 into the heating chamber 11.

Figure 2:
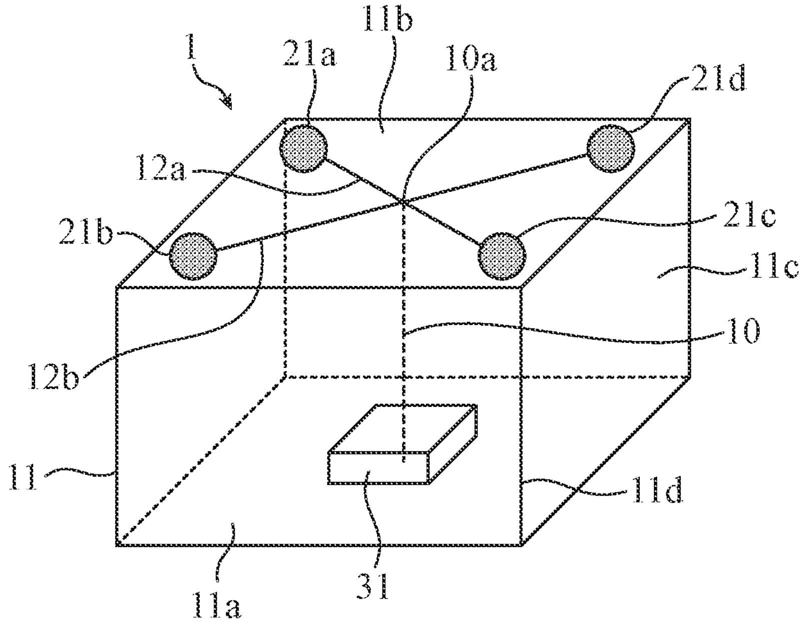
FIG. 2 is a perspective view illustrating the configuration of the heating device in FIG. 1.
Figure 3:
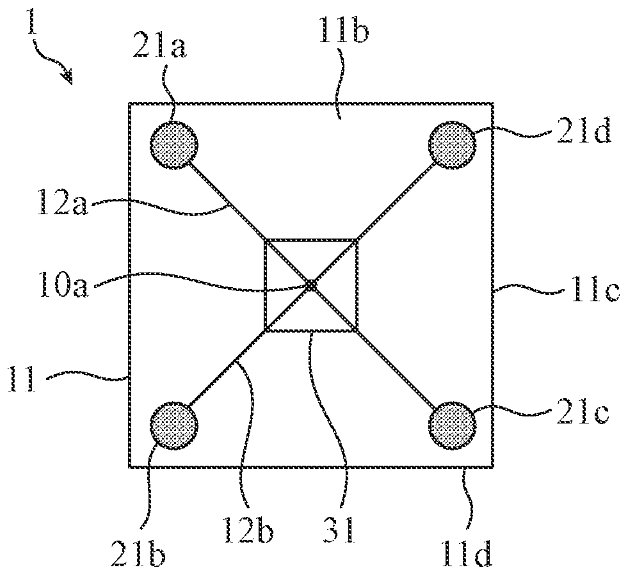
FIG. 3 is a top view illustrating the configuration of the heating device in FIG. 1.
Figure 4:
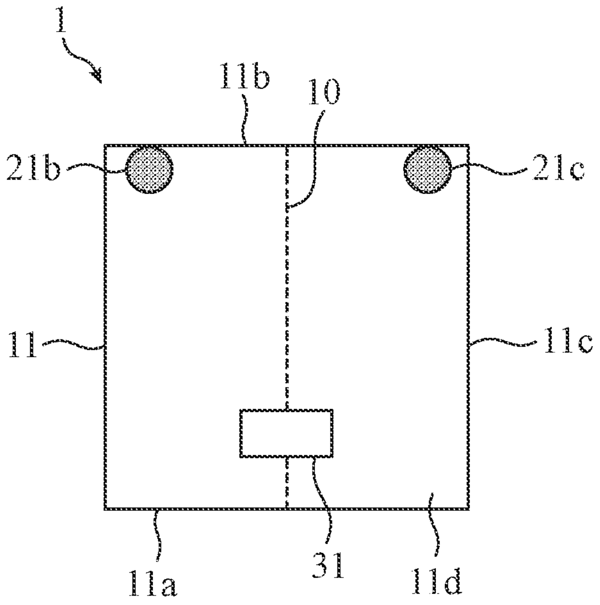
FIG. 4 is a side view illustrating the configuration of the heating device in FIG. 1.

FIG. 2 is a perspective view illustrating the configuration of the heating device 1. FIG. 3 is a top view illustrating the configuration of the heating device 1. FIG. 4 is a side view illustrating the configuration of the heating device 1. In FIGS. 2 to 4, in order to visually recognize the microwave radiation elements 21*a* to 21*d* and the object to be heated 31 inside the heating chamber 11, the walls of the heating chamber 11 are drawn to be transparent, and description of the power generation device 41 and the power distribution circuit 42 is omitted. Further, the heating device 1 shown in FIGS. 2 to 4 includes four microwave radiation elements (N=2) inside the heating chamber 11.

As shown in FIG. 2, the heating chamber 11 has a rectangular parallelepiped shape having a bottom face 11*a*, a top face 11*b*, and side faces 11*c*, and a heating chamber door 11*d* is provided on one of the side faces 11*c*. As described above, the faces other than the side face 11*c* provided with the heating chamber door 11*d* serve as the electromagnetic wave shielding plates, and further the heating chamber door 11*d* has the electromagnetic wave shielding structure, so that the microwave is confined in the heating chamber 11 by the side faces 11*c* and the heating chamber door 11*d*. In the heating chamber 11, in addition to the bottom face 11*a* and the top face 11*b*, the side face 11*c* on which the heating chamber door 11*d* is provided is referred to as a front face, the side face 11*c* opposite to the front face is referred to as a back face, the side face 11*c* on the left side of the front face is referred to as a left side face 11*c*, and the side face 11*c* on the right side of the front face is referred to as a right side face 11*c*.

In the heating chamber 11, a reference line 10 is set. The reference line 10 is an imaginary line serving as a reference for determining positions of pairs of microwave radiation elements arranged in the heating chamber 11, and can be set at various positions in the heating chamber 11 and can be set in various line shapes. The reference line 10 shown in FIGS. 2 to 4 is a vertical line passing through a center of an arrangement space for the object to be heated 31 on the bottom face 11*a*.

The microwave radiation elements 21*a* to 21*d* are arranged on the top face 11*b* side of the heating chamber 11. The microwave radiation element 21*a* and the microwave radiation element 21*c* constitute a first pair of microwave radiation elements, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on the same plane (the plane on the top face 11*b* side)

orthogonal to the reference line 10. The connection line 12*a* and the connection line 12*b* are line segments passing through an intersection point 10*a* where the reference line 10 orthogonally crosses this plane.

Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10*a*. In the second pair of microwave radiation elements, the microwave radiation element 21*b* and the microwave radiation element 21*d* are arranged on the opposite sides with respect to the intersection point 10*a*. For example, as illustrated in FIGS. 2 and 3, the microwave radiation elements 21*a* to 21*d* are arranged on the opposite sides of each diagonal line across the intersection point 10*a*.

In the heating device 1, the microwave radiation elements 21*a* to 21*d* are respectively arranged at positions equidistant from the intersection point 10*a*. In this case, the first pair of microwave radiation elements and the second pair of microwave radiation elements are arranged rotationally symmetrically around the reference line 10.

The power distribution circuit 42 distributes the microwave power generated by the power generation device 41 to the microwave radiation elements 21*a* to 21*d* clockwise or counterclockwise in turn around the reference line 10. At this time, the power distribution circuit 42 distributes the microwave power with a phase difference of an angle (360°/2N) obtained by dividing 360° by 2N, which is the total number of microwave radiation elements. Since N=2, that is, the heating device 1 has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

In addition, by distributing the microwave powers to the microwave radiation elements 21*a* to 21*d* with a phase difference of 360°/2N clockwise or counterclockwise in turn around the reference line 10, the microwave powers are distributed with a phase difference of 180° with each other to the two microwave radiation elements constituting each pair of microwave radiation elements.

For example, when the feeding phase of the microwave power to the microwave radiation element 21*a* is φ, and the phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

As described above, in the heating device 1 according to the first embodiment, the power distribution circuit 42 distributes the microwave powers to the microwave radiation elements 21*a* to 21*d* arranged rotationally symmetrically around the reference line 10 on the plane on the top face 11*b* side of the rectangular parallelepiped heating chamber 11 with advancing the feeding phase with the phase difference of 360°/2N clockwise or counterclockwise. As a result, a composite electric field in the heating chamber 11 rotates at a frequency of the microwave generated by the power generation device 41. The rotation of microwaves in the heating chamber 11 is suitable for heating the object to be heated 31 in a wide range, and occurrence of uneven heating of the object to be heated 31 is suppressed.

Figure 5:
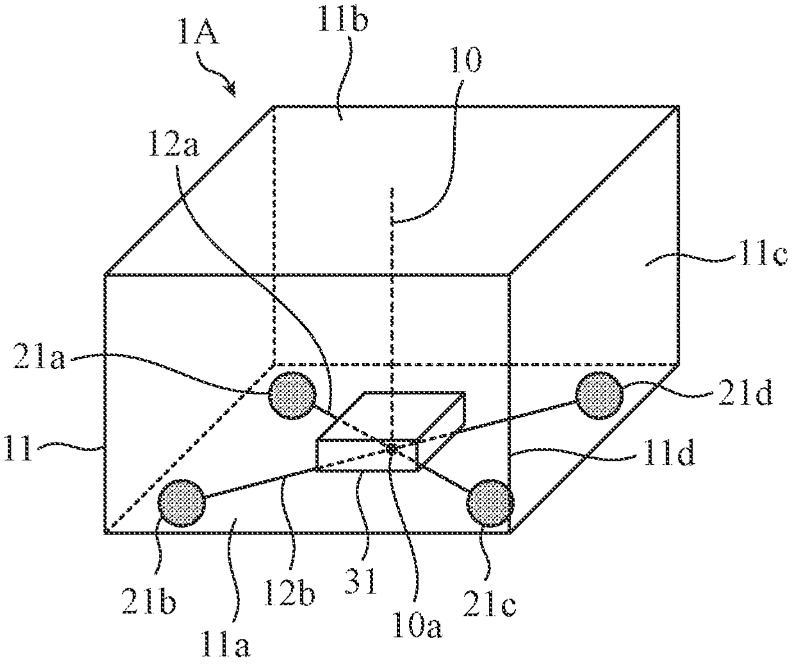
FIG. 5 is a perspective view illustrating a configuration of a first modification of the heating device according to the first embodiment.
Figure 6:
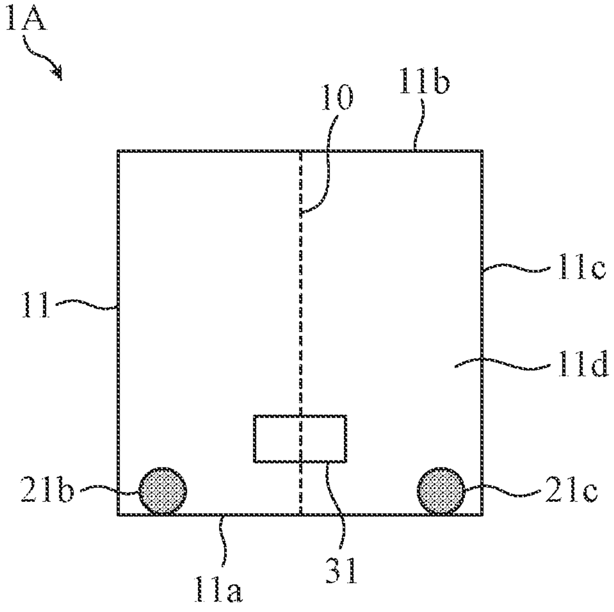
FIG. 6 is a side view illustrating the configuration of the heating device in FIG. 5.

FIG. 5 is a perspective view illustrating a configuration of a first modification of the heating device according to the first embodiment, and illustrates a heating device 1A according to the first modification. FIG. 6 is a side view illustrating the configuration of the heating device 1A. In FIGS. 5 and 6, in order to visually recognize the microwave radiation elements 21*a* to 21*d* and the object to be heated 31 in the heating chamber 11, the walls of the heating chamber 11 are drawn to be transparent, and description of the power generation device 41 and the power distribution circuit 42 is omitted. Further, the heating device 1A includes four microwave radiation elements (N=2) in the heating chamber 11.

Similarly to the heating device 1, the reference line 10 is set in the heating chamber 11. The reference line 10 is an imaginary line serving as a reference for determining positions of pairs of microwave radiation elements arranged in the heating chamber 11, and can be set at various positions in the heating chamber 11 and can be set in various line shapes. The reference line 10 shown in FIGS. 5 and 6 is a vertical line passing through the center of the arrangement space for the object to be heated 31 on the bottom face 11*a*.

The microwave radiation elements 21*a* to 21*d* are arranged on the bottom face 11*a* side of the heating chamber 11. In the heating device 1A, the microwave radiation element 21*a* and the microwave radiation element 21*c* constitute a first pair of microwave radiation elements similarly to the heating device 1, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on the same plane (the plane on the bottom face 11*a* side) orthogonal to the reference line 10. The connection line 12*a* and the connection line 12*b* are line segments passing through an intersection point 10*a* where the reference line 10 orthogonally crosses this plane.

Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10*a*. In the second pair of microwave radiation elements, the microwave radiation element 21*b* and the microwave radiation element 21*d* are arranged on the opposite sides with respect to the intersection point 10*a*. For example, as illustrated in FIG. 5, the microwave radiation elements 21*a* to 21*d* are arranged on the opposite sides of each diagonal line across the intersection point 10*a* on the bottom face 11*a*.

In the heating device 1A, the microwave radiation elements 21*a* to 21*d* are respectively arranged at positions equidistant from the intersection point 10*a*. In this case, the first pair of microwave radiation elements and the second pair of microwave radiation elements are arranged rotationally symmetrically around the reference line 10.

The power distribution circuit 42 distributes the microwave power generated by the power generation device 41 to the microwave radiation elements 21*a* to 21*d* clockwise or counterclockwise in turn around the reference line 10. At this time, the power distribution circuit 42 distributes the microwave power with a phase difference of 360°/2N. Since N=2, that is, the heating device 1A has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

Also in the heating device 1A, by distributing the microwave powers to the microwave radiation elements 21*a* to 21*d* with a phase difference of 360°/2N clockwise or counterclockwise in turn around the reference line 10, the microwave powers are distributed with a phase difference of 180° with each other to the two microwave radiation elements constituting each pair of microwave radiation elements.

For example, when the feeding phase of the microwave power to the microwave radiation element 21*a* is φ, and the phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

In the heating device 1A, the power distribution circuit 42 distributes the microwave powers to the microwave radiation elements 21*a* to 21*d* arranged rotationally symmetrically around the reference line 10 on the plane on the bottom face 11*a* side of the heating chamber 11 with advancing the feeding phase with a phase difference of 360°/2N clockwise or counterclockwise. As a result, the composite electric field in the heating chamber 11 rotates at the frequency of the microwave generated by the power generation device 41. Rotation of the microwave in the heating chamber 11 is an electric field mode suitable for heating the object to be heated 31 in a wide range, and occurrence of uneven heating is suppressed.

Figure 7:
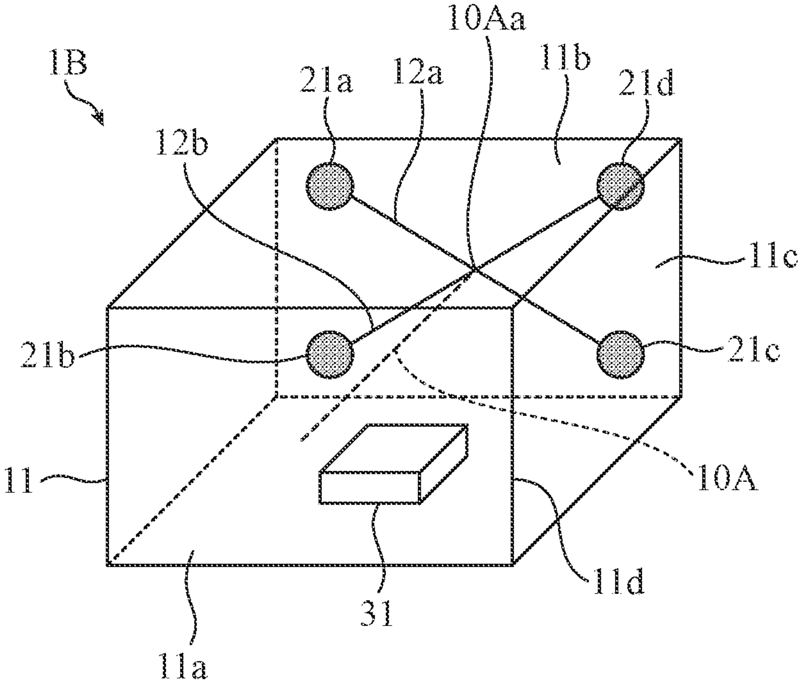
FIG. 7 is a perspective view illustrating a configuration of a second modification of the heating device according to the first embodiment.
Figure 8:
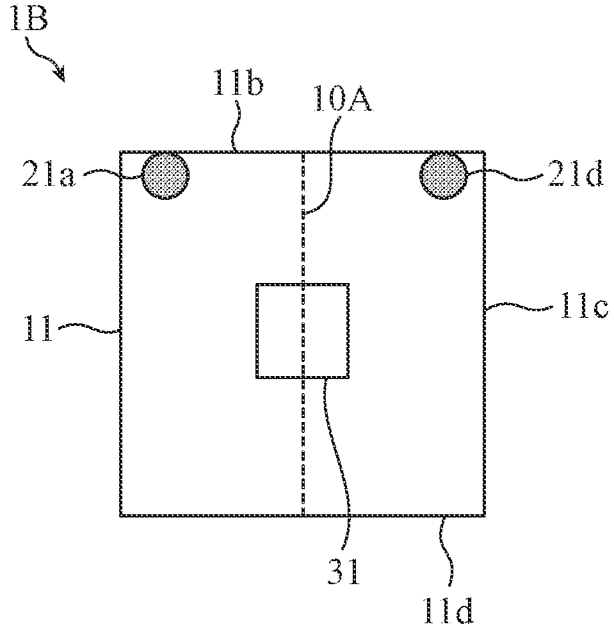
FIG. 8 is a top view illustrating the configuration of the heating device in FIG. 7.
Figure 9:
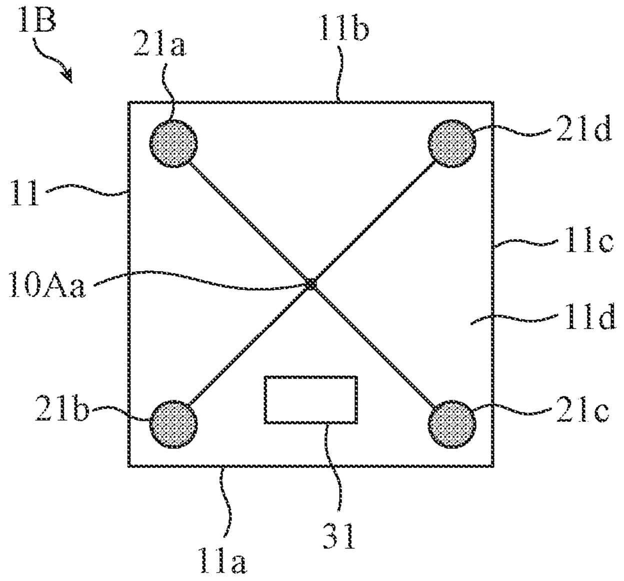
FIG. 9 is a side view illustrating the configuration of the heating device in FIG. 7.

FIG. 7 is a perspective view illustrating a configuration of a second modification of the heating device according to the first embodiment, and illustrates a heating device 1B according to the second modification. FIG. 8 is a top view illustrating the configuration of the heating device 1B, and FIG. 9 is a side view illustrating the configuration of the heating device 1B. In FIGS. 7 to 9, in order to visually recognize the microwave radiation elements 21*a* to 21*d* and the object to be heated 31 in the heating chamber 11, the walls of the heating chamber 11 are drawn to be transparent, and description of the power generation device 41 and the power distribution circuit 42 is omitted. Further, the heating device 1B includes four microwave radiation elements (N=2) in the heating chamber 11.

In the heating device 1B, a reference line 10A is set in the heating chamber 11. The reference line 10A is an imaginary line serving as a reference for determining positions of pairs of microwave radiation elements arranged in the heating chamber 11, and can be set at various positions in the heating chamber 11 and can be set in various line shapes. The reference line 10A illustrated in FIGS. 7 to 9 is a straight line horizontal to the bottom face 11*a*, and is, for example, a straight line in the normal direction of the side face 11*c* on the back face side.

As illustrated in FIGS. 7 to 9, the microwave radiation elements 21*a* to 21*d* are arranged on the side face 11*c* side (back face side) of the heating chamber 11. In the heating device 1B, the microwave radiation element 21*a* and the microwave radiation element 21*c* constitute a first pair of microwave radiation elements similarly to the heating device 1, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on the same plane (plane on the back face side) orthogonal to the reference line 10A. The connection line 12*a* and the connection line 12*b* are line segments passing through an intersection point 10Aa where the reference line 10A is orthogonal to this plane.

Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10Aa. In the second pair of microwave radiation elements, the microwave radiation element 21*b* and the microwave radiation element 21*d* are arranged on the opposite sides with respect to the intersection point 10Aa. For example, as illustrated in FIGS. 7 and 9, the microwave radiation elements 21*a* to 21*d* are arranged on the opposite sides of each diagonal line across the intersection point 10Aa.

In the heating device 1B, the microwave radiation elements 21*a* to 21*d* are respectively arranged at positions equidistant from the intersection point 10Aa. In this case, the first pair of microwave radiation elements and the second pair of microwave radiation elements are arranged rotationally symmetrically around the reference line 10A.

The power distribution circuit 42 distributes the microwave power generated by the power generation device 41 to the microwave radiation elements 21*a* to 21*d* clockwise or counterclockwise in turn around the reference line 10A. At this time, the power distribution circuit 42 distributes the microwave power with a phase difference of 360°/2N. Since N=2, that is, the heating device 1B has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10A. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10A. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

Also in the heating device 1B, by distributing the microwave powers to the microwave radiation elements 21*a* to 21*d* with a phase difference of 360°/2N clockwise or counterclockwise in turn around the reference line 10A, the microwave powers are distributed with a phase difference of 180° with each other to the two microwave radiation elements constituting each pair of microwave radiation elements.

For example, when the feeding phase of the microwave power to the microwave radiation element 21*a* is φ, and the phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

In the heating device 1B, the power distribution circuit 42 distributes the microwave powers to the microwave radiation elements 21*a* to 21*d* arranged rotationally symmetrically around the reference line 10A on the plane on the side face 11*c* side (back face side) of the heating chamber 11 with advancing the feeding phase with a phase difference of 360°/2N clockwise or counterclockwise. As a result, the composite electric field in the heating chamber 11 rotates at the frequency of the microwave generated by the power generation device 41. Rotation of the microwave in the heating chamber 11 is an electric field mode suitable for heating the object to be heated 31 in a wide range, and occurrence of uneven heating is suppressed.

Figure 10:
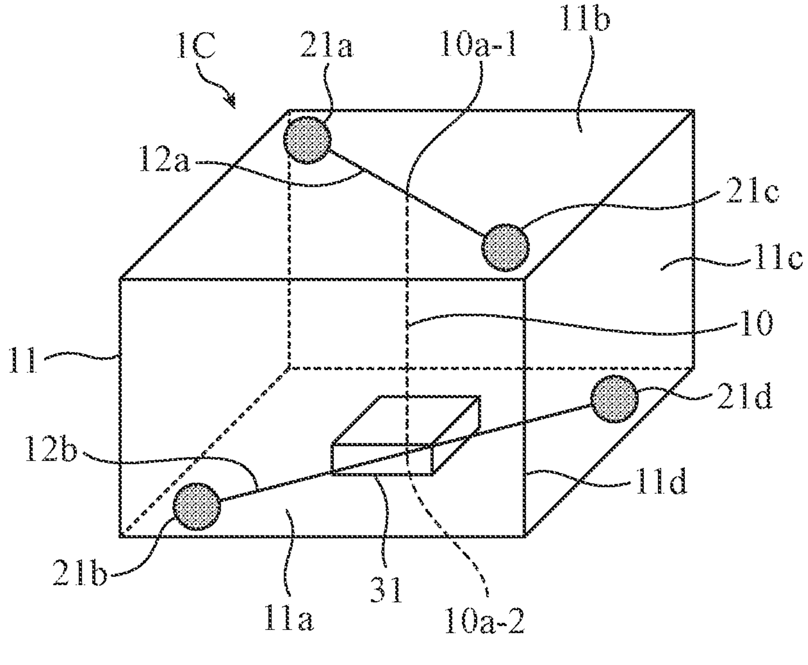
FIG. 10 is a perspective view illustrating a configuration of a third modification of the heating device according to the first embodiment.
Figure 11:
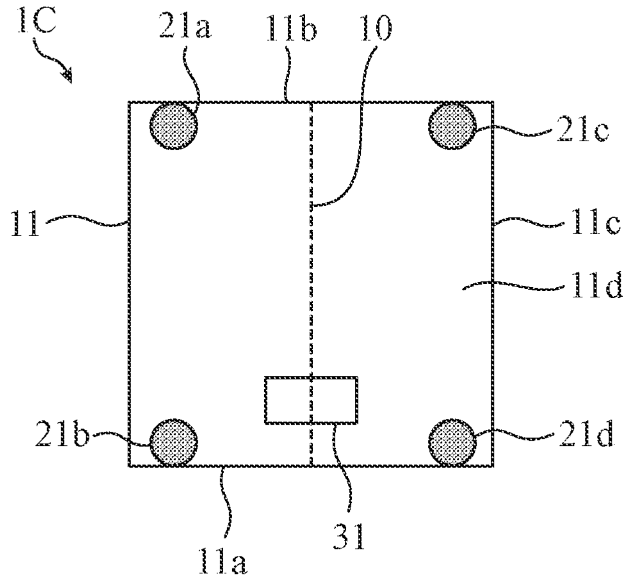
FIG. 11 is a side view illustrating the configuration of the heating device in FIG. 10.

FIG. 10 is a perspective view illustrating a configuration of a third modification of the heating device according to the first embodiment, and illustrates a heating device 1C according to the third modification. FIG. 11 is a side view illustrating the configuration of the heating device 1C. In FIGS. 10 and 11, in order to visually recognize the microwave radiation elements 21*a* to 21*d* and the object to be heated 31 in the heating chamber 11, the walls of the heating chamber 11 are drawn to be transparent, and the description of the power generation device 41 and the power distribution circuit 42 is omitted. The heating device 1C includes four microwave radiation elements (N=2) in the heating chamber 11.

In the heating device 1C, the reference line 10 is set in the heating chamber 11. The reference line 10 is an imaginary line serving as a reference for determining positions of pairs of microwave radiation elements arranged in the heating chamber 11, and can be set at various positions in the heating chamber 11 and can be set in various line shapes. The reference line 10 shown in FIGS. 10 and 11 is a vertical line passing through a center of an arrangement space for the object to be heated 31 on the bottom face 11*a*.

As illustrated in FIGS. 10 and 11, the microwave radiation element 21*a* and the microwave radiation element 21*c* are arranged on the top face 11*b* side of the heating chamber 11, and the microwave radiation element 21*b* and the microwave radiation element 21*d* are arranged on the bottom face 11*a* side. In the heating device 1C, the microwave radiation element 21*a* and the microwave radiation element 21*c* constitute a first pair of microwave radiation elements similarly to the heating device 1, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on mutually different planes (a plane on the bottom face 11*a* side and a plane on the top face 11*b* side) orthogonal to the reference line 10. The connection line 12*a* is a line segment passing through an intersection point 10*a*-1 where the reference line 10 orthogonally crosses the plane on the top face 11*b* side, and the connection line 12*b* is a line segment passing through an intersection point 10*a*-2 where the reference line 10 orthogonally crosses the plane on the bottom face 11*a* side. Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10*a*-1. In the second pair of microwave radiation elements, the microwave radiation element 21*b* and the microwave radiation element 21*d* are arranged on the opposite sides with respect to the intersection point 10*a*-2. For example, as illustrated in FIG. 10, the microwave radiation element 21*a* and the microwave radiation element 21*c* are arranged on the opposite sides of a diagonal line across the intersection point 10*a*-1 on the top face 11*b*, and the microwave radiation element 21*b* and the microwave radiation element 21*d* are arranged on the opposite sides of a diagonal line across the intersection point 10*a*-2 on the bottom face 11*a*.

Further, in the heating device 1C, the microwave radiation element 21*a* and the microwave radiation element 21*c* are respectively arranged at positions equidistant from the intersection point 10*a*-1, and the microwave radiation element 21*b* and the microwave radiation element 21*d* are respectively arranged at positions equidistant from the intersection point 10*a*-2. In this case, the first pair of microwave radiation elements and the second pair of microwave radiation elements are arranged rotationally symmetrically around the reference line 10.

The power distribution circuit 42 distributes the microwave power generated by the power generation device 41 to the microwave radiation elements 21*a* to 21*d* clockwise or counterclockwise in turn around the reference line 10. At this time, the power distribution circuit 42 distributes the microwave power with a phase difference of 360°/2N. Since N=2, that is, the heating device 1C has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

Also in the heating device 1C, by distributing the microwave powers to the microwave radiation elements 21*a* to 21*d* with a phase difference of 360°/2N clockwise or counterclockwise in turn around the reference line 10, the microwave powers are distributed with a phase difference of 180° with each other to the two microwave radiation elements constituting each pair of microwave radiation elements.

For example, when the feeding phase of the microwave power to the microwave radiation element 21*a* is φ, and a phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

In the heating device 1C, the power distribution circuit 42 distributes the microwave powers to the microwave radiation elements 21*a* to 21*d* individually arranged rotationally symmetrically around the reference line 10 on two planes on the bottom face 11*a* side and the top face 11*b* side of the heating chamber 11 with advancing the feeding phase with a phase difference of 360°/2N clockwise or counterclockwise. As a result, the composite electric field in the heating chamber 11 rotates at the frequency of the microwave generated by the power generation device 41. Rotation of the microwave in the heating chamber 11 is an electric field mode suitable for heating the object to be heated 31 in a wide range, and occurrence of uneven heating is suppressed.

Note that, while FIG. 10 and FIG. 11 show the third modification in which the pairs of microwave radiation elements are arranged on the plane on the bottom face 11*a* side and the plane on the top face 11*b* side in the heating chamber 11, the third modification is not limited to this configuration. For example, the heating device 1C may be configured such that the pair of microwave radiation elements are arranged on the plane on the left side face 11*c* side and the plane on the right side face 11*c* side.

Figure 12:
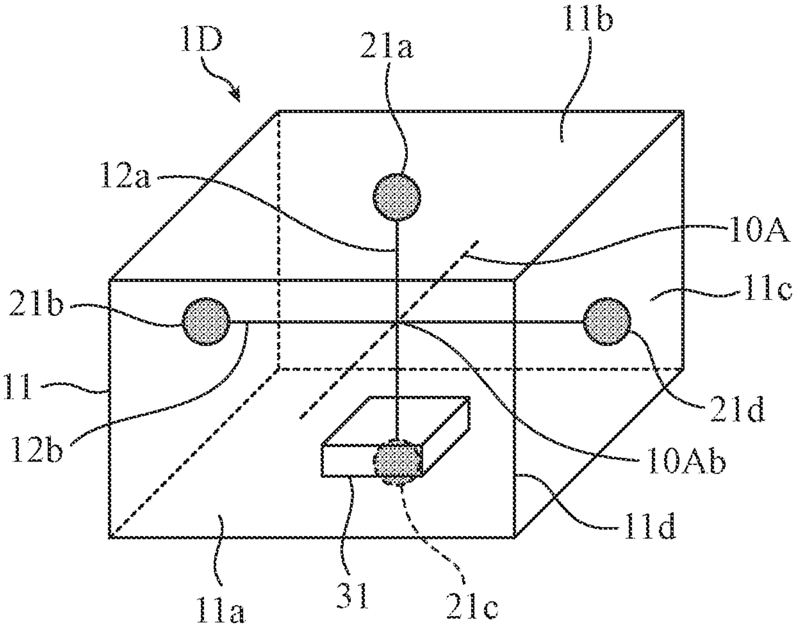
FIG. 12 is a perspective view illustrating a configuration of a fourth modification of the heating device according to the first embodiment.
Figure 13:
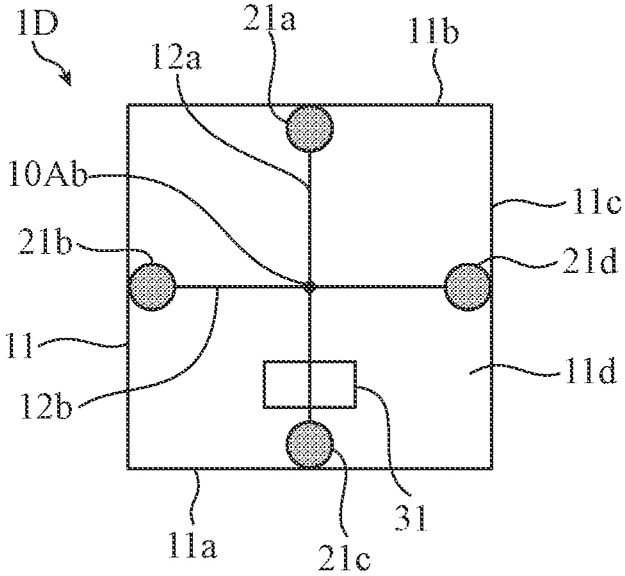
FIG. 13 is a side view illustrating the configuration of the heating device in FIG. 12.
Figure 14:
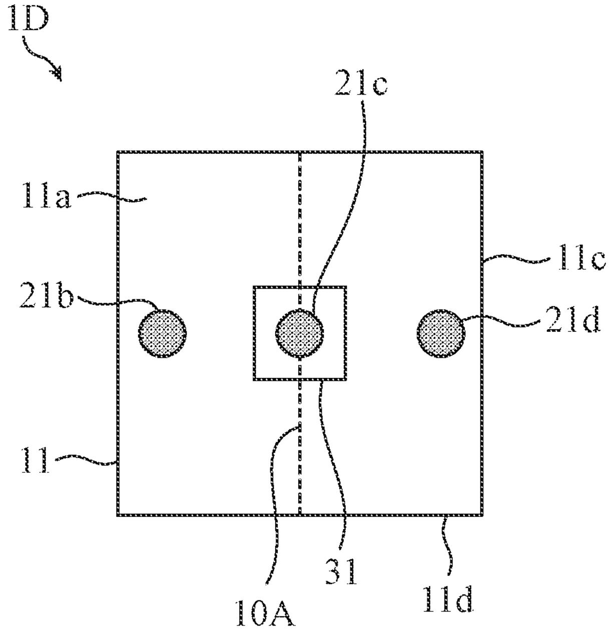
FIG. 14 is a bottom view illustrating the configuration of the heating device in FIG. 12.

FIG. 12 is a perspective view illustrating a configuration of a fourth modification of the heating device according to the first embodiment, and illustrates a heating device 1D according to the fourth modification. FIG. 13 is a side view illustrating the configuration of the heating device 1D, and FIG. 14 is a top view illustrating the configuration of the heating device 1D. In FIGS. 12 to 14, in order to visually recognize the microwave radiation elements 21*a* to 21*d* and the object to be heated 31 in the heating chamber 11, the walls of the heating chamber 11 are drawn to be transparent, and the description of the power generation device 41 and the power distribution circuit 42 is omitted. Further, the heating device 1D includes four microwave radiation elements (N=2) in the heating chamber 11.

In the heating device 1D, a reference line 10A is set in the heating chamber 11. The reference line 10A is an imaginary line serving as a reference for determining positions of pairs of microwave radiation elements arranged in the heating chamber 11, and can be set at various positions in the heating chamber 11 and can be set in various line shapes. The reference line 10A illustrated in FIGS. 12 to 14 is a straight line horizontal to the bottom face 11*a*, and is, for example, a straight line in the normal direction of the side face 11*c* on the back face side.

As illustrated in FIGS. 12 and 14, the microwave radiation elements 21*a* to 21*d* are arranged in the heating chamber 11 between a side face 11*c* (front face) provided with the heating chamber door 11*d* and a side face 11*c* (back face) facing the side face 11*c* (front face). In the heating device 1D, the microwave radiation element 21*a* and the microwave radiation element 21*c* constitute a first pair of microwave radiation elements, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on the same plane (the plane between the front face and the back face) orthogonal to the reference line 10A. The connection line 12*a* and the connection line 12*b* are line segments passing through an intersection point 10Aa where the reference line 10A is orthogonal to this plane.

Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10Ab, and in the second pair of microwave radiation elements, the microwave radiation element 21*b* and the microwave radiation element 21*d* are arranged on the opposite sides with respect to the intersection point 10Ab. For example, as illustrated in FIG. 13, in the first pair of microwave radiation elements, the microwave radiation element 21*a* is disposed on the top face 11*b* side and the microwave radiation element 21*c* is disposed on the bottom face 11*a* side across the intersection point 10Ab. In the second pair of microwave radiation elements, the microwave radiation element 21*b* is disposed on the left side face 11*c*, and the microwave radiation element 21*d* is disposed on the right side face 11*c* across the intersection point 10Ab.

Further, in the heating device 1D, the microwave radiation elements 21*a* to 21*d* are respectively arranged at positions equidistant from the intersection point 10Ab. In this case, the first pair of microwave radiation elements and the second pair of microwave radiation elements are arranged rotationally symmetrically around the reference line 10A.

The power distribution circuit 42 distributes the microwave power generated by the power generation device 41 to the microwave radiation elements 21*a* to 21*d* clockwise or counterclockwise in turn around the reference line 10A. At this time, the power distribution circuit 42 distributes the microwave power with a phase difference of 360°/2N. Since N=2, that is, the heating device 1D has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10A. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10A. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

Also in the heating device 1D, by distributing the microwave powers to the microwave radiation elements 21*a* to 21*d* with a phase difference of 360°/2N clockwise or counterclockwise in turn around the reference line 10A, the microwave powers are distributed with a phase difference of 180° with each other to the two microwave radiation elements constituting each pair of microwave radiation elements.

For example, when the feeding phase of the microwave power to the microwave radiation element 21*a* is φ, and the phase difference of 90° is set to the feeding phase of the microwave power counterclockwise in turn around the reference line 10A, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

In the heating device 1D, the power distribution circuit 42 distributes the microwave powers to the microwave radiation elements 21*a* to 21*d* arranged rotationally symmetrically around the reference line 10A on the plane between the front face and the back face of the heating chamber 11 with advancing the feeding phase with a phase difference of 360°/2N clockwise or counterclockwise. As a result, the composite electric field in the heating chamber 11 rotates at the frequency of the microwave generated by the power generation device 41. Rotation of the microwave in the heating chamber 11 is an electric field mode suitable for heating the object to be heated 31 in a wide range, and occurrence of uneven heating is suppressed.

Figure 15:
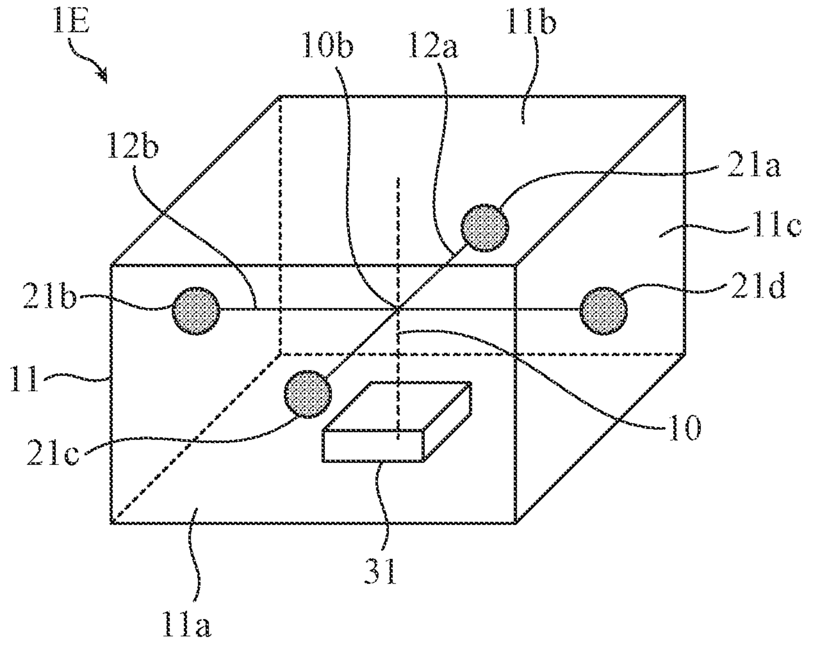
FIG. 15 is a perspective view illustrating a configuration of a fifth modification of the heating device according to the first embodiment.
Figure 16:
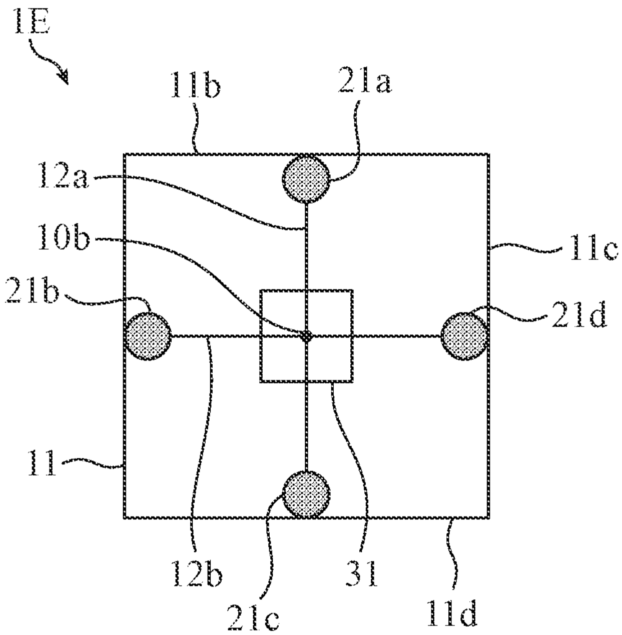
FIG. 16 is a top view illustrating the configuration of the heating device in FIG. 15.
Figure 17:
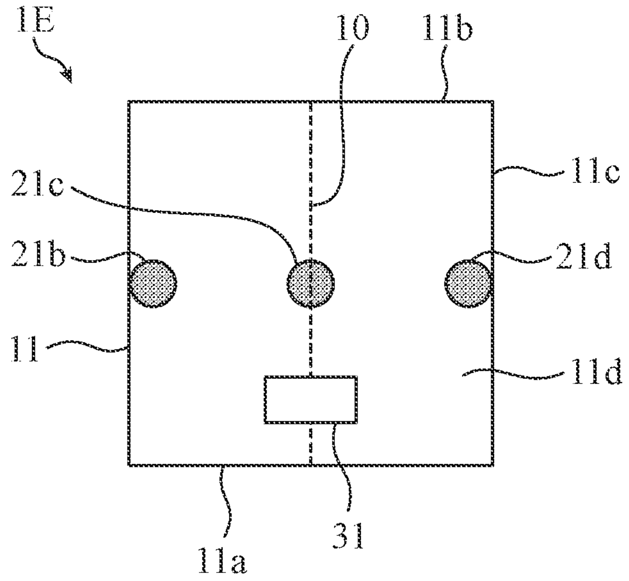
FIG. 17 is a side view illustrating the configuration of the heating device in FIG. 15.

FIG. 15 is a perspective view illustrating a configuration of a fifth modification of the heating device according to the first embodiment, and illustrates a heating device 1E according to the fifth modification. FIG. 16 is a top view illustrating the configuration of the heating device 1E, and FIG. 17 is a side view illustrating the configuration of the heating device 1E. In FIGS. 15 to 17, in order to visually recognize the microwave radiation elements 21*a* to 21*d* and the object to be heated 31 in the heating chamber 11, the walls of the heating chamber 11 are drawn to be transparent, and the description of the power generation device 41 and the power distribution circuit 42 is omitted. Further, the heating device 1E includes four microwave radiation elements (N=2) in the heating chamber 11.

In the heating device 1E, a reference line 10 is set in the heating chamber 11. The reference line 10 is an imaginary line serving as a reference for determining positions of pairs of microwave radiation elements arranged in the heating chamber 11, and can be set at various positions in the heating chamber 11 and can be set in various line shapes. The reference line 10 shown in FIGS. 15 to 17 is a vertical line passing through a center of an arrangement space for the object to be heated 31 on the bottom face 11*a*. In the heating device 1E, the heating chamber door 11*d* is not provided on the front face of the heating chamber 11, but is provided on the top face 11*b*.

As illustrated in FIGS. 15 and 17, the microwave radiation elements 21*a* to 21*d* are arranged between the bottom face 11*a* and the top face 11*b* of the heating chamber 11. In the heating device 1E, the microwave radiation element 21*a* and the microwave radiation element 21*c* constitute a first pair of microwave radiation elements, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on the same plane (the plane between the bottom face 11*a* and the top face 11*b*) orthogonal to the reference line 10. This plane is, for example, a plane passing through an intermediate position of the height from the bottom face 11*a* to the top face 11*b*.

The connection line 12*a* and the connection line 12*b* are line segments passing through the intersection point 10*b* where the reference line 10 orthogonally crosses this plane. Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10*b*, and in the second pair of microwave radiation elements, the microwave radiation element 21*b* and the microwave radiation element 21*d* are arranged on the opposite sides with respect to the intersection point 10*b*. For example, as illustrated in FIG. 16, in the first pair of microwave radiation elements, the microwave radiation element 21*a* is disposed on the side face 11*c* of the back face, and the microwave radiation element 21*c* is disposed on the side face 11*c* of the front face across the intersection point 10*b*. In the second pair of microwave radiation elements, the microwave radiation element 21*b* is disposed on the left side face 11*c*, and the microwave radiation element 21*d* is disposed on the right side face 11*c* across the intersection point 10*b*.

Further, in the heating device 1E, the microwave radiation elements 21*a* to 21*d* are respectively arranged at positions equidistant from the intersection point 10*b*. In this case, the first pair of microwave radiation elements and the second pair of microwave radiation elements are rotationally symmetric around the reference line 10.

The power distribution circuit 42 distributes the microwave power generated by the power generation device 41 to the microwave radiation elements 21*a* to 21*d* clockwise or counterclockwise in turn around the reference line 10. At this time, the power distribution circuit 42 distributes the microwave power with a phase difference of 360°/2N. Since N=2, that is, the heating device 1E has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

Also in the heating device 1E, by distributing the microwave powers to the microwave radiation elements 21*a* to 21*d* with a phase difference of 360°/2N clockwise or counterclockwise in turn around the reference line 10, the microwave powers are distributed with a phase difference of 180° with each other to the two microwave radiation elements constituting each pair of microwave radiation elements.

For example, when the feeding phase of the microwave power to the microwave radiation element 21*a* is φ, and the phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

In the heating device 1E, the power distribution circuit 42 distributes the microwave powers to the microwave radiation elements 21*a* to 21*d* arranged rotationally symmetrically around the reference line 10 on the plane between the bottom face 11*a* and the top face 11*b* of the heating chamber 11 with advancing the feeding phase with a phase difference of 360°/2N clockwise or counterclockwise. As a result, the composite electric field in the heating chamber 11 rotates at the frequency of the microwave generated by the power generation device 41. Rotation of the microwave in the heating chamber 11 is an electric field mode suitable for heating the object to be heated 31 in a wide range, and occurrence of uneven heating is suppressed.

Second Embodiment

Figure 18:
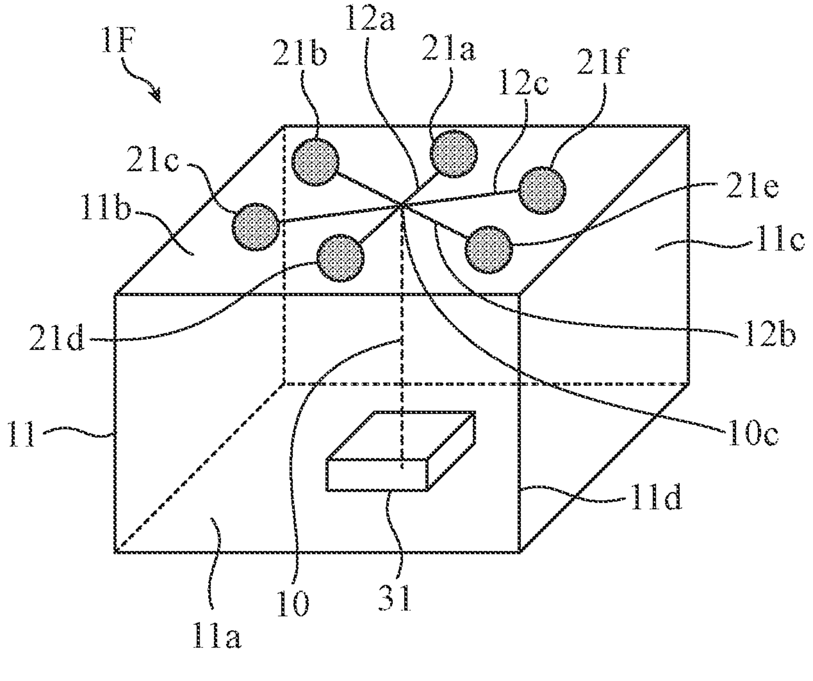
FIG. 18 is a perspective view illustrating a configuration of a heating device according to a second embodiment.
Figure 19:
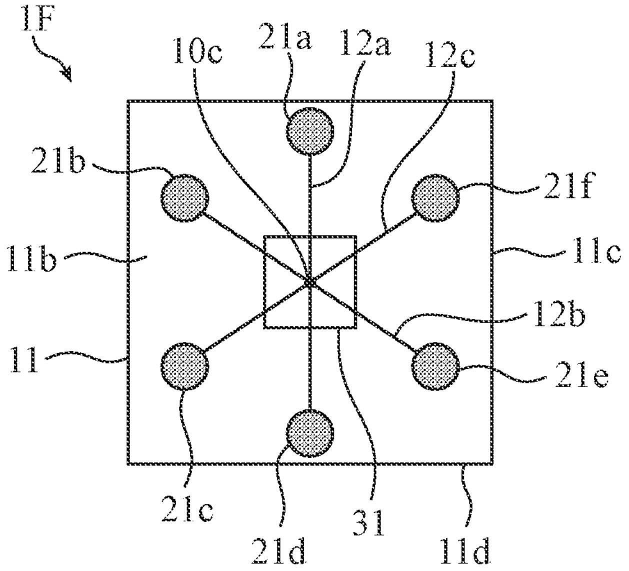
FIG. 19 is a top view illustrating the configuration of the heating device in FIG. 18.

FIG. 18 is a perspective view illustrating a configuration of a heating device 1F according to the second embodiment. FIG. 19 is a top view illustrating the configuration of the heating device 1F. In FIGS. 18 and 19, in order to visually recognize microwave radiation elements 21*a* to 21*f* and an object to be heated 31 in a heating chamber 11, the walls of the heating chamber 11 are drawn to be transparent, and the description of a power generation device 41 and a power distribution circuit 42 is omitted. The heating device 1F includes six microwave radiation elements (N=3) in the heating chamber 11.

The heating chamber 11 has a rectangular parallelepiped shape having a bottom face 11*a*, a top face 11*b*, and side faces 11*c*, and a heating chamber door 11*d* is provided on one of the side faces 11*c*. The faces other than a side face on which the heating chamber door 11*d* is provided serve as electromagnetic wave shielding plates, and the heating chamber door 11*d* is provided with an electromagnetic wave shielding structure, so that microwaves are confined inside the heating chamber 11. In the heating chamber 11, in addition to the bottom face 11*a* and the top face 11*b*, the side face 11*c* on which the heating chamber door 11*d* is provided is referred to as a front face, the side face 11*c* opposite to the front face is referred to as a back face, the side face 11*c* on the left side of the front face is referred to as a left side face 11*c*, and the side face 11*c* on the right side of the front face is referred to as a right side face 11*c*.

In the heating chamber 11, a reference line 10 is set. The reference line 10 is an imaginary line serving as a reference for determining positions of pairs of microwave radiation elements arranged in the heating chamber 11, and can be set at various positions in the heating chamber 11 and can be set in various line shapes. The reference line 10 shown in FIGS. 18 and 19 is a vertical line passing through a center of an arrangement space for the object to be heated 31 on the bottom face 11*a*.

The microwave radiation elements 21*a* to 21*f* are arranged on the top face 11*b* side of the heating chamber 11. The microwave radiation element 21*a* and the microwave radiation element 21*d* constitute a first pair of microwave radiation elements, and are associated with each other by a connection line 12*a*. The microwave radiation element 21*b* and the microwave radiation element 21*e* constitute a second pair of microwave radiation elements, and are associated with each other by a connection line 12*b*. Further, the microwave radiation element 21*c* and the microwave radiation element 21*f* constitute a third pair of microwave radiation elements, and are associated with each other by a connection line 12*c*.

The first pair of microwave radiation elements, the second pair of microwave radiation elements, and the third pair of microwave radiation elements are arranged on the same plane (the plane on the top face 11*b* side) orthogonal to the reference line 10. The connection line 12*a*, the connection line 12*b*, and the connection line 12*c* are line segments passing through an intersection point 10*c* where the reference line 10 orthogonally crosses this plane. Note that the connection line 12*a*, the connection line 12*b*, and the connection line 12*c* are imaginary lines drawn to specify respective pairs of microwave radiation elements described in the drawings, and are not lines shown on a real object.

In the first pair of microwave radiation elements, the microwave radiation element 21*a* and the microwave radiation element 21*d* are arranged on the opposite sides with respect to the intersection point 10*c*. In the second pair of microwave radiation elements, the microwave radiation element 21*b* and the microwave radiation element 21*e* are arranged on the opposite sides with respect to the intersection point 10*c*. In the third pair of microwave radiation elements, the microwave radiation element 21*c* and the microwave radiation element 21*f* are arranged on the opposite sides with respect to the intersection point 10*c*.

In the heating device 1F, the microwave radiation elements 21*a* to 21*f* are respectively arranged at positions equidistant from the intersection point 10*c*. In this case, the first pair of microwave radiation elements, the second pair of microwave radiation elements, and the third pair of microwave radiation elements are arranged rotationally symmetrically around the reference line 10.

The power distribution circuit 42 distributes the microwave power generated by the power generation device 41 to the microwave radiation elements 21*a* to 21*f* clockwise or counterclockwise in turn around the reference line 10. At this time, the power distribution circuit 42 distributes the microwave power with a phase difference of 360°/2N. Since N=3, that is, the heating device 1F has the first pair of microwave radiation elements, the second pair of microwave radiation elements, and the third pair of microwave radiation elements, the power distribution circuit 42 distributes the microwave powers to the microwave radiation elements 21*a* to 21*f* with a phase difference of 60°.

For example, when the feeding phase of the microwave power to the microwave radiation element 21*a* is φ, the power distribution circuit 42 distributes the microwave power by setting the phase difference of 60° to the feeding phase of the microwave power counterclockwise in turn around the reference line 10. At this time, the feeding phase to the microwave radiation element 21*b* is φ+60°, the feeding phase to the microwave radiation element 21*c* is φ+120°, the feeding phase to the microwave radiation element 21*d* is φ+180°, the feeding phase to the microwave radiation element 21*e* is φ+240°, and the feeding phase to the microwave radiation element 21*f* is φ+300°.

Similarly, the power distribution circuit 42 may distribute the microwave power by setting the phase difference of 60° to the feeding phase of the microwave power clockwise in turn around the reference line 10. For example, when the feeding phase of the microwave power to the microwave radiation element 21*a* is φ, the feeding phase to the microwave radiation element 21*f* is set to φ+60°, the feeding phase to the microwave radiation element 21*e* is set to φ+120°, the feeding phase to the microwave radiation element 21*d* is set to φ+180°, the feeding phase to the microwave radiation element 21*c* is set to φ+240°, and the feeding phase to the microwave radiation element 21*b* is set to φ+300°.

In addition, by distributing the microwave powers to the microwave radiation elements 21*a* to 21*f* with a phase difference of 360°/2N clockwise or counterclockwise in turn around the reference line 10, the microwave powers are distributed with a phase difference of 180° with each other to the two microwave radiation elements constituting each pair of microwave radiation elements.

For example, when the feeding phase of the microwave power to the microwave radiation element 21*a* is φ, and the phase difference of 60° is set to the feeding phase of the microwave power counterclockwise in turn around the reference line 10, the feeding phase to the microwave radiation element 21*b* is φ+60°, the feeding phase to the microwave radiation element 21*c* is φ+120°, the feeding phase to the microwave radiation element 21*d* is φ+180°, the feeding phase to the microwave radiation element 21*e* is φ+240°, and the feeding phase to the microwave radiation element 21*f* is φ+300°. At this time, the phase difference between the microwave radiation elements in each of the first pair of microwave radiation elements, the second pair of microwave radiation elements, and the third pair of microwave radiation elements is 180°.

As described above, in the heating device 1F according to the second embodiment, the power distribution circuit 42 distributes the microwave powers to the microwave radiation elements 21*a* to 21*f* arranged rotationally symmetrically around the reference line 10 on the plane on the top face 11*b* side of the heating chamber 11 with advancing the feeding phase with a phase difference of 360°/2N clockwise or counterclockwise. As a result, the composite electric field in the heating chamber 11 rotates at the frequency of the microwave generated by the power generation device 41. Rotation of the microwave in the heating chamber 11 is an electric field mode suitable for heating the object to be heated 31 in a wide range, and occurrence of uneven heating is suppressed.

Note that, in the second embodiment, the configuration in which the microwave radiation elements 21*a* to 21*f* are arranged on the top face 11*b* side of the heating chamber 11 is shown with reference to FIGS. 18 and 19. However, the present disclosure is not limited to this configuration. For example, the heating device according to the second embodiment also includes a configuration in which the microwave radiation elements 21*a* to 21*d* included in each of the heating device according to the first to fifth modifications in the first embodiment are replaced with the microwave radiation elements 21*a* to 21*f*.

Third Embodiment

Figure 20:
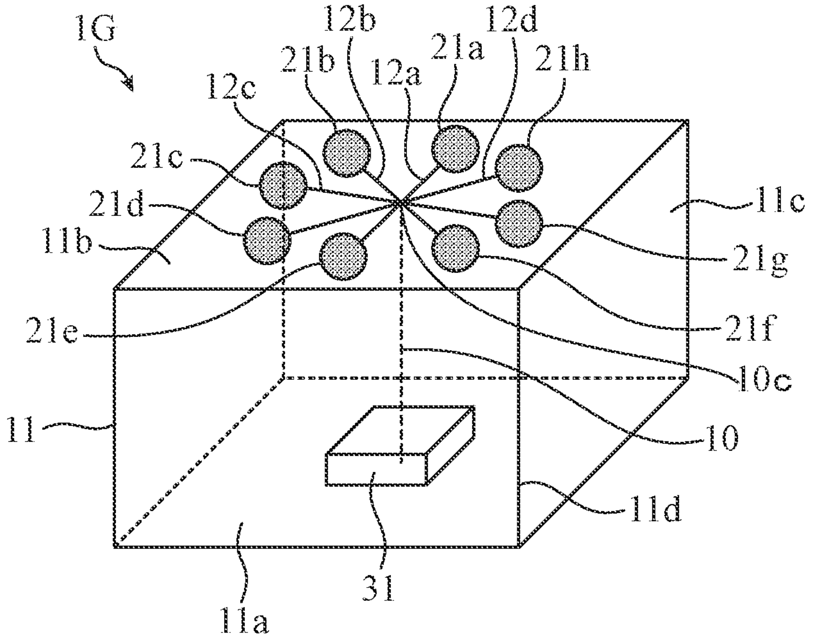
FIG. 20 is a perspective view illustrating a configuration of a heating device according to a third embodiment.
Figure 21:
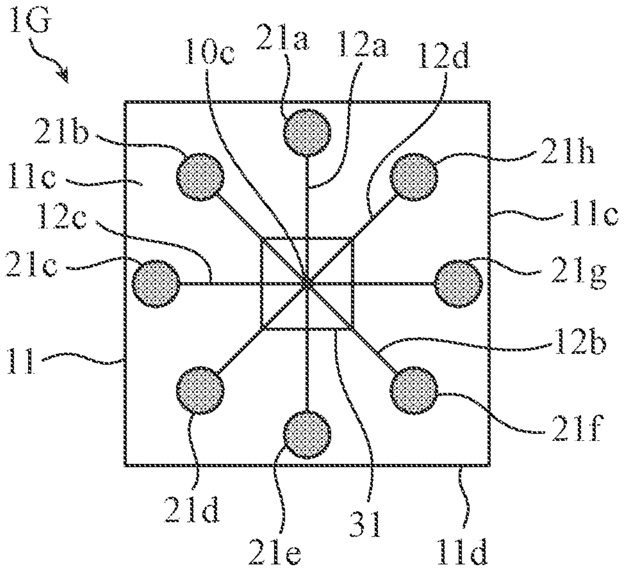
FIG. 21 is a top view illustrating the configuration of the heating device in FIG. 20.

FIG. 20 is a perspective view illustrating a configuration of a heating device 1G according to the third embodiment. FIG. 21 is a top view illustrating the configuration of the heating device 1G. In FIGS. 20 and 21, in order to visually recognize microwave radiation elements 21*a* to 21*h* and an object to be heated 31 in a heating chamber 11, the walls of the heating chamber 11 are drawn to be transparent, and the description of a power generation device 41 and a power distribution circuit 42 is omitted. Further, the heating device 1G includes eight microwave radiation elements (N=4) in the heating chamber 11.

As shown in FIG. 20, the heating chamber 11 has a rectangular parallelepiped shape having a bottom face 11*a*, a top face 11*b*, and side faces 11*c*, and a heating chamber door 11*d* is provided on one of the side faces 11*c*. The faces other than a side face on which the heating chamber door 11*d* is provided serve as electromagnetic wave shielding plates, and the heating chamber door 11*d* is provided with an electromagnetic wave shielding structure, so that microwaves are confined in the heating chamber 11. In the heating chamber 11, in addition to the bottom face 11*a* and the top face 11*b*, the side face 11*c* on which the heating chamber door 11*d* is provided is referred to as a front face, the side face 11*c* opposite to the front face is referred to as a back face, the side face 11*c* on the left side of the front face is referred to as a left side face 11*c*, and the side face 11*c* on the right side of the front face is referred to as a right side face 11*c*.

In the heating chamber 11, a reference line 10 is set. The reference line 10 is an imaginary line serving as a reference for determining positions of pairs of microwave radiation elements arranged in the heating chamber 11, and can be set at various positions in the heating chamber 11 and can be set in various line shapes. The reference line 10 shown in FIGS. 20 and 21 is a vertical line passing through a center of an arrangement space for the object to be heated 31 on the bottom face 11*a*.

The microwave radiation elements 21*a* to 21*h* are arranged on the top face 11*b* side of the heating chamber 11. The microwave radiation elements 21*a* and 21*e* constitute a first pair of microwave radiation elements, and are associated with each other by a connection line 12*a*. The microwave radiation elements 21*b* and 21*f* constitute a second pair of microwave radiation elements, and are associated with each other by a connection line 12*b*. The microwave radiation elements 21*c* and 21*g* constitute a third pair of microwave radiation elements, and are associated with each other by a connection line 12*c*. The microwave radiation elements 21*d* and 21*h* constitute a fourth pair of microwave radiation elements, and are associated with each other by a connection line 12*d*.

The first pair of microwave radiation elements, the second pair of microwave radiation elements, the third pair of microwave radiation elements, and the fourth pair of microwave radiation elements are arranged on the same plane (the plane on the top face 11*b* side) orthogonal to the reference line 10. The connection line 12*a*, the connection line 12*b*, the connection line 12*c*, and the connection line 12*d* are line segments passing through an intersection point 10*c* where the reference line 10 orthogonally crosses this plane. Note that the connection line 12*a*, the connection line 12*b*, the connection line 12*c*, and the connection line 12*d* are imaginary lines drawn to specify respective pairs of microwave radiation elements described in the drawings, and are not lines shown on a real object.

In the first pair of microwave radiation elements, the microwave radiation element 21*a* and the microwave radiation element 21*e* are arranged on the opposite sides with respect to the intersection point 10*c*. In the second pair of microwave radiation elements, the microwave radiation element 21*b* and the microwave radiation element 21*f* are arranged on the opposite sides with respect to the intersection point 10*c*. In the third pair of microwave radiation elements, the microwave radiation element 21*c* and the microwave radiation element 21*g* are arranged on the opposite sides with respect to the intersection point 10*c*. In the fourth pair of microwave radiation elements, the microwave radiation element 21*d* and the microwave radiation element 21*h* are arranged on the opposite sides with respect to the intersection point 10*c*.

In the heating device 1G, the microwave radiation elements 21*a* to 21*h* are respectively arranged at positions equidistant from the intersection point 10*c*. In this case, the first pair of microwave radiation elements, the second pair of microwave radiation elements, the third pair of microwave radiation elements, and the fourth pair of microwave radiation elements are arranged rotationally symmetrically around the reference line 10.

The power distribution circuit 42 distributes the microwave power generated by the power generation device 41 to the microwave radiation elements 21*a* to 21*h* clockwise or counterclockwise in turn around the reference line 10. At this time, the power distribution circuit 42 distributes the microwave power with a phase difference of 360°/2N. Since N=4, that is, the heating device 1F has the first pair of microwave radiation elements, the second pair of microwave radiation elements, the third pair of microwave radiation elements, and the fourth pair of microwave radiation elements, the power distribution circuit 42 distributes the microwave powers to the microwave radiation elements 21*a* to 21*f* with a phase difference of 45°.

For example, when the feeding phase of the microwave power to the microwave radiation element 21*a* is φ, the power distribution circuit 42 distributes the microwave power by setting the phase difference of 45° to the feeding phase of the microwave power counterclockwise in turn around the reference line 10. At this time, the feeding phase to the microwave radiation element 21*b* is φ+45°, the feeding phase to the microwave radiation element 21*c* is φ+90°, the feeding phase to the microwave radiation element 21*d* is φ+135°, the feeding phase to the microwave radiation element 21*e* is φ+180°, the feeding phase to the microwave radiation element 21*f* is φ+225°, the feeding phase to the microwave radiation element 21*g* is φ+270°, and the feeding phase to the microwave radiation element 21*h* is φ+315°.

Similarly, the power distribution circuit 42 may distribute the microwave power by setting the phase difference of 45° to the feeding phase of the microwave power clockwise in turn around the reference line 10. For example, when the feeding phase of the microwave power to the microwave radiation element 21*a* is φ, the feeding phase to the microwave radiation element 21*h* is set to φ+45°, the feeding phase to the microwave radiation element 21*g* is set to φ+90°, the feeding phase to the microwave radiation element 21*f* is set to φ+135°, the feeding phase to the microwave radiation element 21*e* is set to φ+180°, the feeding phase to the microwave radiation element 21*d* is set to φ+225°, the feeding phase to the microwave radiation element 21*c* is set to φ+270°, and the feeding phase to the microwave radiation element 21*b* is set to φ+315°.

In addition, by distributing the microwave powers to the microwave radiation elements 21*a* to 21*h* with a phase difference of 360°/2N clockwise or counterclockwise in turn around the reference line 10, the microwave powers are distributed with a phase difference of 180° with each other to the two microwave radiation elements constituting each pair of microwave radiation elements.

For example, when the feeding phase of the microwave power to the microwave radiation element 21*a* is φ, and a phase difference of 45° is set to the feeding phase of the microwave power counterclockwise in turn around the reference line 10, the feeding phase to the microwave radiation element 21*b* is φ+45°, the feeding phase to the microwave radiation element 21*c* is φ+90°, the feeding phase to the microwave radiation element 21*d* is φ+135°, the feeding phase to the microwave radiation element 21*e* is φ+180°, the feeding phase to the microwave radiation element 21*f* is φ+225°, the feeding phase to the microwave radiation element 21*g* is φ+270°, and the feeding phase to the microwave radiation element 21*h* is φ+315°. At this time, the phase difference between the microwave radiation elements in each of the first pair of microwave radiation elements, the second pair of microwave radiation elements, the third pair of microwave radiation elements, and the fourth pair of microwave radiation elements is 180°.

As described above, in the heating device 1G according to the third embodiment, the power distribution circuit 42 distributes the microwave powers to the microwave radiation elements 21*a* to 21*h* arranged rotationally symmetrically around the reference line 10 on the plane on the top face 11*b* side of the heating chamber 11 with advancing the feeding phase with a phase difference of 360°/2N clockwise or counterclockwise. As a result, the composite electric field in the heating chamber 11 rotates at the frequency of the microwave generated by the power generation device 41. Rotation of the microwave in the heating chamber 11 is an electric field mode suitable for heating the object to be heated 31 in a wide range, and occurrence of uneven heating is suppressed.

Note that in the third embodiment, the configuration in which the microwave radiation elements 21*a* to 21*h* are arranged on the top face 11*b* side of the heating chamber 11 is shown with reference to FIGS. 20 and 21, however, no limitation is intended thereto. For example, the heating device according to the third embodiment also includes a configuration in which the microwave radiation elements 21*a* to 21*d* included in each of the heating device according to the first to fifth modifications of the first embodiment are replaced with the microwave radiation elements 21*a* to 21*h*.

Fourth Embodiment

Figure 22:
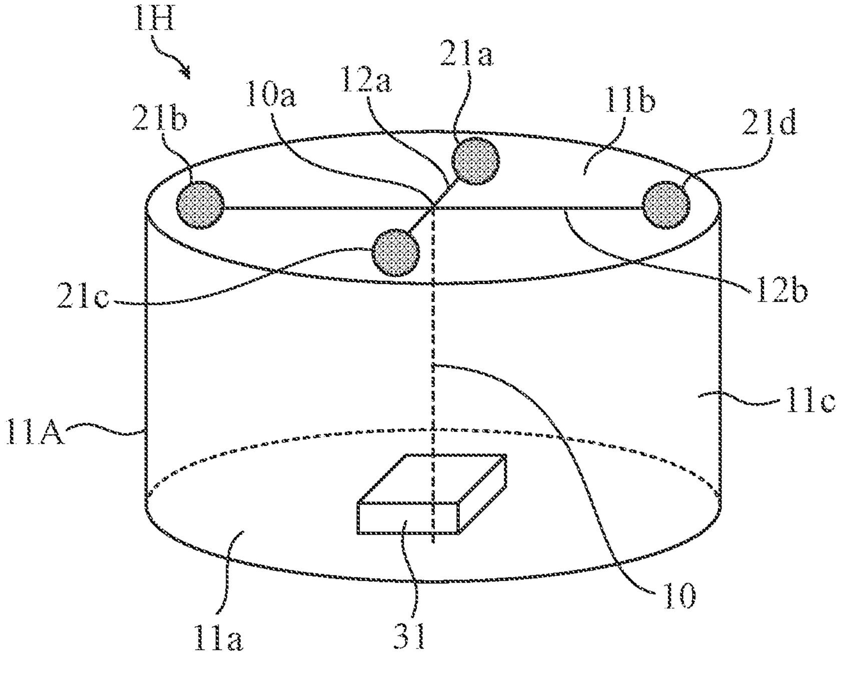
FIG. 22 is a perspective view illustrating a configuration of a heating device according to a fourth embodiment.
Figure 23:
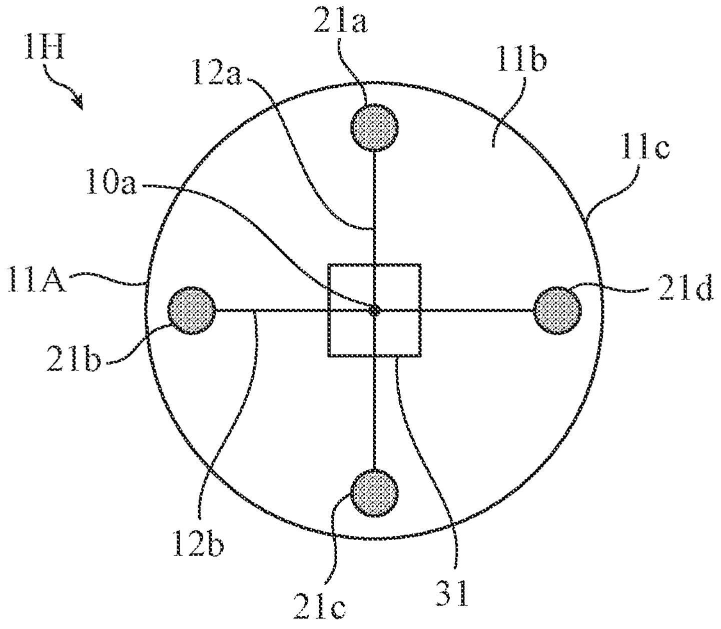
FIG. 23 is a top view illustrating the configuration of the heating device in FIG. 22.

FIG. 22 is a perspective view illustrating a configuration of a heating device 1H according to the fourth embodiment. FIG. 23 is a top view illustrating the configuration of the heating device 1H. In FIGS. 22 and 23, in order to visually recognize microwave radiation elements 21*a* to 21*d* and an object to be heated 31 in a heating chamber 11A, the walls of the heating chamber 11 are drawn to be transparent, and the description of a power generation device 41 and a power distribution circuit 42 is omitted. Further, the heating device 1H includes four microwave radiation elements (N=2) in the heating chamber 11A.

As shown in FIG. 22, the heating chamber 11A has a cylindrical shape having a bottom face 11*a*, a top face 11*b*, and a side face 11*c*, and a heating chamber door 11*d* is provided on a part of the side face 11*c*. A portion other than the part on which the heating chamber door 11*d* is provided is made of a metal material, and the heating chamber door 11*d* is provided with an electromagnetic wave shielding structure, so that microwaves are confined in the heating chamber 11A.

In the heating chamber 11A, a reference line 10 is set. The reference line 10 is an imaginary line serving as a reference for determining positions of pairs of microwave radiation elements arranged in the heating chamber 11A, and can be set at various positions in the heating chamber 11A and can be set in various line shapes. The reference line 10 shown in FIG. 22 is a vertical line passing through a center of an arrangement space for the object to be heated 31 on the bottom face 11*a*.

The microwave radiation elements 21*a* to 21*d* are arranged on the top face 11*b* side of the heating chamber 11A. The microwave radiation element 21*a* and the microwave radiation element 21*c* constitute a first pair of microwave radiation elements, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on the same plane (the plane on the top face 11*b* side) orthogonal to the reference line 10. The connection line 12*a* and the connection line 12*b* are line segments passing through an intersection point 10*a* where the reference line 10 orthogonally crosses this plane.

Note that the connection line 12*a* and the connection line 12*b* are imaginary lines set to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10*a*. In the second pair of microwave radiation elements, the microwave radiation element 21*b* and the microwave radiation element 21*d* are arranged on the opposite sides with respect to the intersection point 10*a*.

In the heating device 1H, the microwave radiation elements 21*a* to 21*d* are respectively arranged at positions equidistant from the intersection point 10*a*. In this case, the first pair of microwave radiation elements and the second pair of microwave radiation elements are arranged rotationally symmetrically around the reference line 10.

The power distribution circuit 42 distributes the microwave power generated by the power generation device 41 to the microwave radiation elements 21*a* to 21*d* clockwise or counterclockwise in turn around the reference line 10. At this time, the power distribution circuit 42 distributes the microwave power with a phase difference of 360°/2N. Since N=2, that is, the heating device 1H has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

In addition, by distributing the microwave powers to the microwave radiation elements 21*a* to 21*d* with a phase difference of 360°/2N clockwise or counterclockwise in turn around the reference line 10, the microwave powers are distributed with a phase difference of 180° with each other to the two microwave radiation elements constituting each pair of microwave radiation elements.

For example, when the feeding phase of the microwave power to the microwave radiation element 21*a* is φ, and the phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

As described above, in the heating device 1H according to the fourth embodiment, the power distribution circuit 42 distributes the microwave powers to the microwave radiation elements 21*a* to 21*d* arranged rotationally symmetrically around the reference line 10 on the plane on the top face 11*b* side of the cylindrical heating chamber 11A with advancing the feeding phase with a phase difference of 360°/2N clockwise or counterclockwise. As a result, the composite electric field in the heating chamber 11A rotates at the frequency of the microwave generated by the power generation device 41. Rotation of microwaves in the heating chamber 11A is an electric field mode suitable for heating the object to be heated 31 in a wide range, and occurrence of uneven heating is suppressed.

Figure 24:
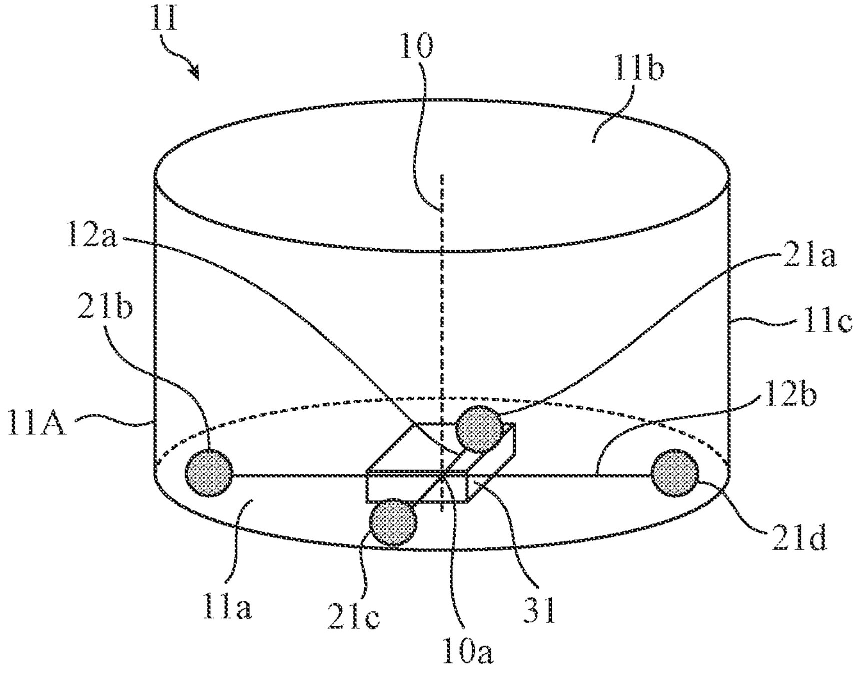
FIG. 24 is a perspective view illustrating a configuration of a first modification of the heating device according to the fourth embodiment.

FIG. 24 is a perspective view illustrating a configuration of a first modification of the heating device according to the fourth embodiment, and illustrates a heating device 1I according to the first modification. In FIG. 24, in order to visually recognize the microwave radiation elements 21*a* to 21*d* and the object to be heated 31 in the heating chamber 11A, the walls of the heating chamber 11 are drawn to be transparent, and description of the power generation device 41 and the power distribution circuit 42 is omitted. Further, the heating device 1I includes four microwave radiation elements (N=2) in the heating chamber 11.

Similarly to the heating device 1, the reference line 10 is set in the heating chamber 11A. The reference line 10 is an imaginary line serving as a reference for determining positions of pairs of microwave radiation elements arranged in the heating chamber 11A, and can be set at various positions in the heating chamber 11A and can be set in various line shapes. The reference line 10 shown in FIG. 24 is a vertical line passing through a center of an arrangement space for the object to be heated 31 on the bottom face 11*a*.

The microwave radiation elements 21*a* to 21*d* are arranged on the bottom face 11*a* side of the heating chamber 11A. In the heating device 1A, the microwave radiation element 21*a* and the microwave radiation element 21*c* constitute a first pair of microwave radiation elements similarly to the heating device 1, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on the same plane (the plane on the bottom face 11*a* side) orthogonal to the reference line 10. The connection line 12*a* and the connection line 12*b* are line segments passing through an intersection point 10*a* where the reference line 10 orthogonally crosses this plane.

Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10*a*. In the second pair of microwave radiation elements, the microwave radiation element 21*b* and the microwave radiation element 21*d* are arranged on the opposite sides with respect to the intersection point 10*a*.

Further, in the heating device 1I, the microwave radiation elements 21*a* to 21*d* are respectively arranged at positions equidistant from the intersection point 10*a*. In this case, the first pair of microwave radiation elements and the second pair of microwave radiation elements are arranged rotationally symmetrically around the reference line 10.

The power distribution circuit 42 distributes the microwave power generated by the power generation device 41 to the microwave radiation elements 21*a* to 21*d* clockwise or counterclockwise in turn around the reference line 10. At this time, the power distribution circuit 42 distributes the microwave power with a phase difference of 360°/2N. Since N=2, that is, the heating device 1I has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

Also in the heating device 1I, by distributing the microwave powers to the microwave radiation elements 21*a* to 21*d* with a phase difference of 360°/2N clockwise or counterclockwise in turn around the reference line 10, the microwave powers are distributed with a phase difference of 180° with each other to the two microwave radiation elements constituting each pair of the microwave radiation elements.

For example, when the feeding phase of the microwave power to the microwave radiation element 21*a* is φ, and the phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

In the heating device 1I, the power distribution circuit 42 distributes the microwave powers to the microwave radiation elements 21*a* to 21*d* arranged rotationally symmetrically around the reference line 10 on the plane on the bottom face 11*a* side of the heating chamber 11A with advancing the feeding phase with a phase difference of 360°/2N clockwise or counterclockwise. As a result, the composite electric field in the heating chamber 11A rotates at the frequency of the microwave generated by the power generation device 41. The rotation of microwaves in the heating chamber 11A is an electric field mode suitable for heating the object to be heated 31 in a wide range, so that occurrence of uneven heating is suppressed.

Figure 25:
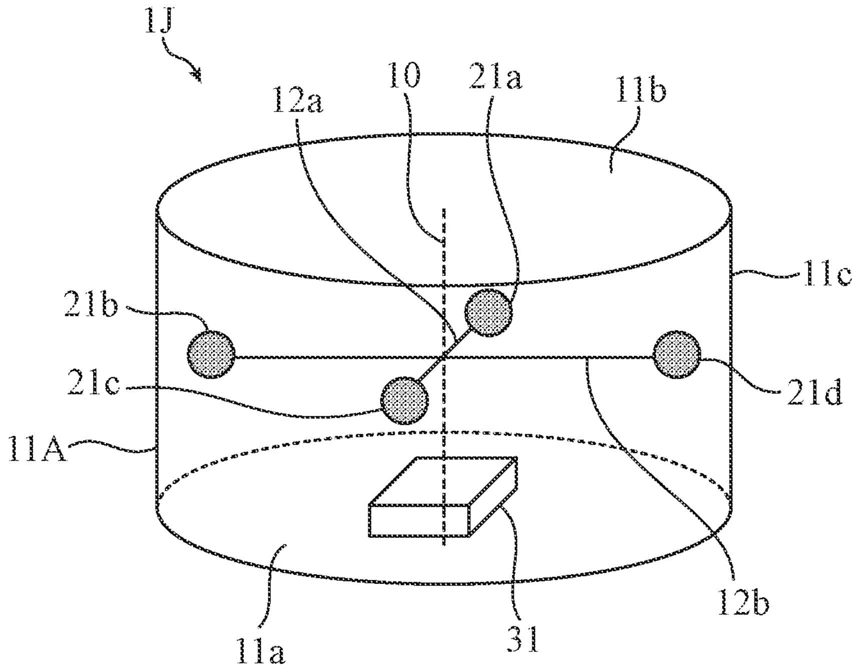
FIG. 25 is a perspective view illustrating a configuration of a second modification of the heating device according to the fourth embodiment.
Figure 26:
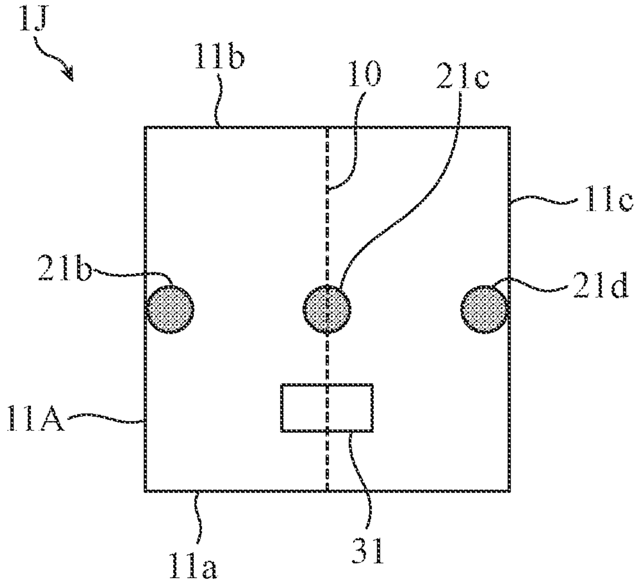
FIG. 26 is a side view illustrating the configuration of the heating device in FIG. 25.

FIG. 25 is a perspective view illustrating a configuration of a second modification of the heating device according to the fourth embodiment, and illustrates a heating device 1J according to the second modification. FIG. 26 is a side view illustrating the configuration of the heating device 1J. In FIGS. 25 and 26, in order to visually recognize microwave radiation elements 21*a* to 21*d* and an object to be heated 31 in a heating chamber 11A, the walls of the heating chamber 11 are drawn to be transparent, and description of a power generation device 41 and a power distribution circuit 42 is omitted. Further, the heating device 1J includes four microwave radiation elements (N=2) in the heating chamber 11A.

Similarly to the heating device 1H and the heating device 1I, the reference line 10 is set in the heating chamber 11A. The reference line 10 is an imaginary line serving as a reference for determining positions of pairs of microwave radiation elements arranged in the heating chamber 11A, and can be set at various positions in the heating chamber 11A and can be set in various line shapes. The reference line 10 shown in FIGS. 25 and 26 is a vertical line passing through a center of an arrangement space for the object to be heated 31 on the bottom face 11*a*.

As illustrated in FIGS. 25 and 26, the microwave radiation elements 21*a* to 21*d* are arranged between the bottom face 11*a* and the top face 11*b* of the heating chamber 11A. In the heating device 1J, the microwave radiation element 21*a* and the microwave radiation element 21*c* constitute a first pair of microwave radiation elements, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on the same plane (the plane between the bottom face 11*a* and the top face 11*b*) orthogonal to the reference line 10. This plane is, for example, a plane passing through an intermediate position of the height from the bottom face 11*a* to the top face 11*b*.

The connection line 12*a* and the connection line 12*b* are line segments passing through the intersection point 10*b* where the reference line 10 orthogonally crosses this plane. Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10*b*, and in the second pair of microwave radiation elements, the microwave radiation element 21*b* and the microwave radiation element 21*d* are arranged on the opposite sides with respect to the intersection point 10*b*.

Further, in the heating device 1J, the microwave radiation elements 21*a* to 21*d* are respectively arranged at positions equidistant from the intersection point 10*b*. In this case, the first pair of microwave radiation elements and the second pair of microwave radiation elements are rotationally symmetric around the reference line 10.

The power distribution circuit 42 distributes the microwave power generated by the power generation device 41 to the microwave radiation elements 21*a* to 21*d* clockwise or counterclockwise in turn around the reference line 10. At this time, the power distribution circuit 42 distributes the microwave power with a phase difference of 360°/2N. Since N=2, that is, the heating device 1J has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

Also in the heating device 1J, by distributing the microwave powers to the microwave radiation elements 21*a* to 21*d* with a phase difference of 360°/2N clockwise or counterclockwise in turn around the reference line 10, the microwave powers are distributed with a phase difference of 180° with each other to the two microwave radiation elements constituting each pair of the microwave radiation elements.

For example, when the feeding phase of the microwave power to the microwave radiation element 21*a* is φ, and the phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

In the heating device 1J, the power distribution circuit 42 distributes the microwave powers to the microwave radiation elements 21*a* to 21*d* arranged rotationally symmetrically around the reference line 10 on the plane between the bottom face 11*a* and the top face 11*b* of the heating chamber 11A with advancing the feeding phase with a phase difference of 360°/2N clockwise or counterclockwise. As a result, the composite electric field in the heating chamber 11A rotates at the frequency of the microwave generated by the power generation device 41. Rotation of the microwave in the heating chamber 11A is an electric field mode suitable for heating the object to be heated 31 in a wide range, and occurrence of uneven heating is suppressed.

Figure 27:
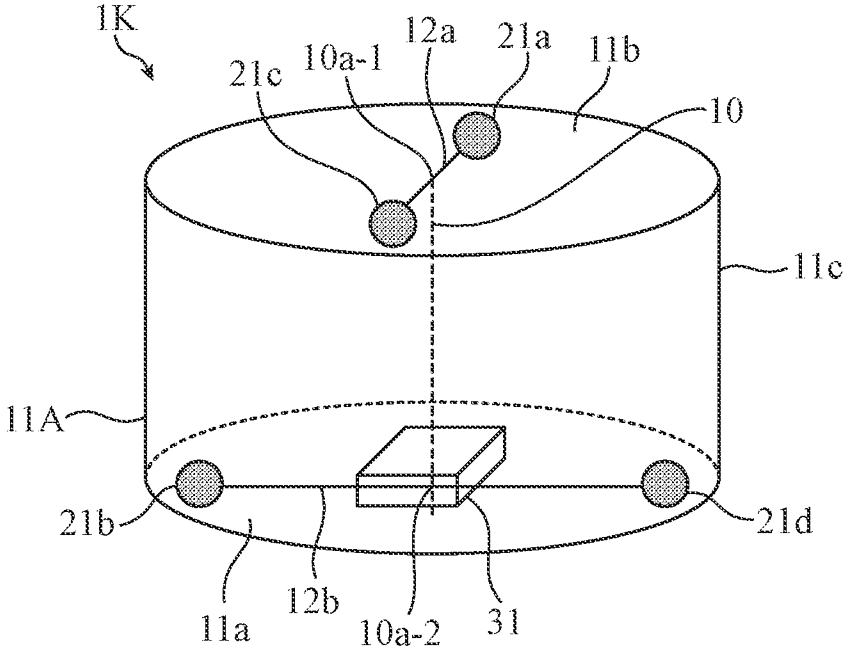
FIG. 27 is a perspective view illustrating a configuration of a third modification of the heating device according to the fourth embodiment.
Figure 28:
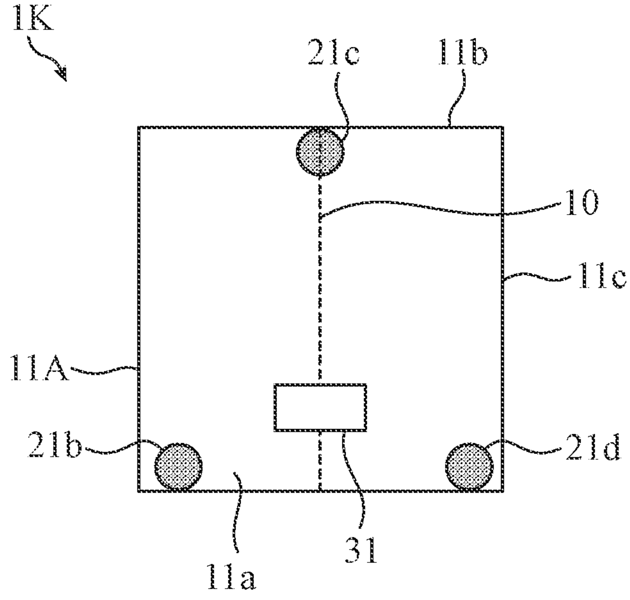
FIG. 28 is a side view illustrating the configuration of the heating device in FIG. 27.

FIG. 27 is a perspective view illustrating a configuration of a third modification of the heating device according to the fourth embodiment, and illustrates a heating device 1K according to the third modification. FIG. 28 is a side view illustrating the configuration of the heating device 1K. In FIGS. 27 and 28, in order to visually recognize microwave radiation elements 21*a* to 21*d* and an object to be heated 31 in a heating chamber 11A, the walls of the heating chamber 11 are drawn to be transparent, and description of a power generation device 41 and a power distribution circuit 42 is omitted. Further, the heating device 1K includes four microwave radiation elements (N=2) in the heating chamber 11A.

In the heating device 1K, a reference line 10 is set in the heating chamber 11A. The reference line 10 is an imaginary line serving as a reference for determining positions of pairs of microwave radiation elements arranged in the heating chamber 11A, and can be set at various positions in the heating chamber 11A and can be set in various line shapes. The reference line 10 shown in FIGS. 27 and 28 is a vertical line passing through a center of an arrangement space for the object to be heated 31 on the bottom face 11*a*.

As illustrated in FIGS. 27 and 28, the microwave radiation element 21*a* and the microwave radiation element 21*c* are arranged on the top face 11*b* side of the heating chamber 11A, and the microwave radiation element 21*b* and the microwave radiation element 21*d* are arranged on the bottom face 11*a* side. In the heating device 1K, the microwave radiation element 21*a* and the microwave radiation element 21*c* constitute a first pair of microwave radiation elements similarly to the heating device 1, and are associated with each other by a connection line 12*a*. The microwave radiation element 21*b* and the microwave radiation element 21*d* constitute a second pair of microwave radiation elements, and are associated with each other by a connection line 12*b*.

The first pair of microwave radiation elements and the second pair of microwave radiation elements are arranged on mutually different planes (a plane on the bottom face 11*a* side and a plane on the top face 11*b* side) orthogonal to the reference line 10. The connection line 12*a* is a line segment passing through an intersection point 10*a*-1 where the reference line 10 orthogonally crosses the plane on the top face 11*b* side, and the connection line 12*b* is a line segment passing through an intersection point 10*a*-2 where the reference line 10 orthogonally crosses the plane on the bottom face 11*a* side. Note that the connection line 12*a* and the connection line 12*b* are imaginary lines drawn to specify respective pairs of microwave radiation elements described in the drawings, and are not lines shown on a real object.

In the first pair of microwave radiation elements, the microwave radiation element 21*a* and the microwave radiation element 21*c* are arranged on the opposite sides with respect to the intersection point 10*a*-1. In the second pair of microwave radiation elements, the microwave radiation element 21*b* and the microwave radiation element 21*d* are arranged on the opposite sides with respect to the intersection point 10*a*-2.

Further, in the heating device 1K, the microwave radiation element 21*a* and the microwave radiation element 21*c* are respectively arranged at positions equidistant from the intersection point 10*a*-1, and the microwave radiation element 21*b* and the microwave radiation element 21*d* are respectively arranged at positions equidistant from the intersection point 10*a*-2. In this case, the first pair of microwave radiation elements and the second pair of microwave radiation elements are arranged rotationally symmetrically around the reference line 10.

The power distribution circuit 42 distributes the microwave power generated by the power generation device 41 to the microwave radiation elements 21*a* to 21*d* clockwise or counterclockwise in turn around the reference line 10. At this time, the power distribution circuit 42 distributes the microwave power with a phase difference of 360°/2N. Since N=2, that is, the heating device 1K has the first pair of microwave radiation elements and the second pair of microwave radiation elements, the power distribution circuit 42 distributes the microwave powers to the microwave radiation elements 21*a* to 21*d* with a phase difference of 90°.

For example, when the feeding phase of the microwave power to the microwave radiation element 21*a* is φ, the power distribution circuit 42 distributes the microwave power by setting the phase difference of 90° to the feeding phase of the microwave power counterclockwise in turn around the reference line 10. At this time, the feeding phase to the microwave radiation element 21*b* is φ+90°, the feeding phase to the microwave radiation element 21*c* is φ+180°, and the feeding phase to the microwave radiation element 21*d* is φ+270°.

Similarly, the power distribution circuit 42 may distribute the microwave power by setting the phase difference of 90° to the feeding phase of the microwave power clockwise in turn around the reference line 10. For example, when the feeding phase of the microwave power to the microwave radiation element 21*a* is φ, the feeding phase to the microwave radiation element 21*d* is set to φ+90°, the feeding phase to the microwave radiation element 21*c* is set to φ+180°, and the feeding phase to the microwave radiation element 21*b* is set to φ+270°.

Also in the heating device 1K, by distributing the microwave powers to the microwave radiation elements 21*a* to 21*d* with a phase difference of 360°/2N clockwise or counterclockwise in turn around the reference line 10, the microwave powers are distributed with a phase difference of 180° with each other to the two microwave radiation elements constituting each pair of the microwave radiation elements.

For example, when the feeding phase of the microwave power to the microwave radiation element 21*a* is φ, and a phase difference of 90° is set to the feeding phase of the microwave power counterclockwise in turn around the reference line 10, the feeding phase to the microwave radiation element 21*b* is φ+90°, the feeding phase to the microwave radiation element 21*c* is φ+180°, and the feeding phase to the microwave radiation element 21*d* is φ+270°. At this time, the phase difference between the microwave radiation elements in the first pair of microwave radiation elements is 180°, and the phase difference between the microwave radiation elements in the second pair of microwave radiation elements is 180°.

In the heating device 1K, the power distribution circuit 42 distributes the microwave powers to the microwave radiation elements 21*a* to 21*d* individually arranged rotationally symmetrically around the reference line 10 on two planes on the bottom face 11*a* side and the top face 11*b* side of the heating chamber 11A with advancing the feeding phase with a phase difference of 360°/2N clockwise or counterclockwise. As a result, the composite electric field in the heating chamber 11A rotates at the frequency of the microwave generated by the power generation device 41. Rotation of microwaves in the heating chamber 11A is an electric field mode suitable for heating the object to be heated 31 in a wide range, and occurrence of uneven heating is suppressed.

In the fourth embodiment, the reference line 10 that is a vertical line passing through the center of the arrangement space for the object to be heated 31 on the bottom face 11*a* is illustrated. However, in the heating device according to the fourth embodiment, a straight line connecting side faces of the cylindrical heating chamber 11A can be used as the reference line. The reference line is, for example, a line segment corresponding to the diameter of the bottom face 11*a* or the top face 11*b*, or a line segment parallel to the diameter of the bottom face 11*a* or the top face 11*b*.

Note that, in the above, the configuration in which the microwave radiation elements 21*a* to 21*d* are arranged in the heating chamber 11A is shown, however, no limitation is intended thereto. For example, the heating device according to the fourth embodiment also includes a configuration in which the microwave radiation elements 21*a* to 21*d* are replaced with the microwave radiation elements 21*a* to 21*f* described in the second embodiment, and also includes a configuration in which the microwave radiation elements 21*a* to 21*d* are replaced with the microwave radiation elements 21*a* to 21*h* described in the third embodiment. In addition, when the third modification of the heating device according to the fourth embodiment includes three or more pairs of microwave radiation elements, the pair of microwave radiation elements are arranged on each of the three or more planes to which the reference line 10 crosses orthogonally.

Here, a detailed configuration of the microwave radiation element 21 described in the first to fourth embodiments will be described.

Figure 29:
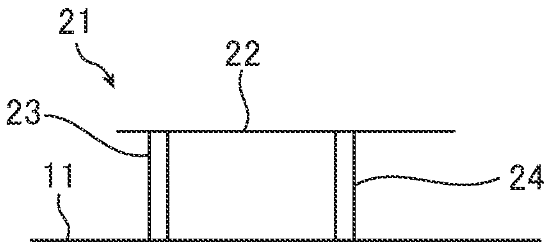
FIG. 29 is a schematic view illustrating an outline of a configuration of a microwave radiation element according to each of the first to fourth embodiments.

FIG. 29 is a schematic view illustrating an outline of the configuration of the microwave radiation element 21 according to the first to fourth embodiments. As illustrated in FIG. 29, the microwave radiation element 21 includes a microwave radiation element pattern 22, a feeding pin 23, and a short-circuit pin 24. The microwave power distributed by the power distribution circuit 42 is supplied to the microwave radiation element pattern 22 through the feeding pin 23. Since the heating chamber 11 or the heating chamber 11A forms an electrically closed space, the microwave radiation element pattern 22 and the feeding pin 23 are not in contact with the heating chamber 11 or the heating chamber 11A.

On the other hand, the short-circuit pin 24 is connected to the microwave radiation element pattern 22. Since the heating chamber 11 or the heating chamber 11A is connected to the short-circuit pin 24 as a ground, the microwave radiation element 21 is an element short-circuited to the heating chamber 11 or the heating chamber 11A as a result. By thus short-circuiting the microwave radiation element 21 with the heating chamber 11 or the heating chamber 11A, heat generated by the microwave radiation element receiving high power can be released to the heating chamber 11 or the heating chamber 11A as a housing.

In the above description, the case where the number of microwave radiation elements is 2N (N is a natural number equal to or greater than two) is shown, but any other number of elements can be applied to the configurations described in the first to fourth embodiments.

It should be noted that the present invention is not limited to the above-described embodiments, and within the scope of the present invention, free combination of each of the embodiments, modification of any constituent element of each of the embodiments, or omission of any constituent element of each of the embodiments can be made.

INDUSTRIAL APPLICABILITY

The heating device according to the present invention can suppress occurrence of uneven heating of an object to be heated, and thus can be used for various heating devices that radiate microwaves to perform heating.

REFERENCE SIGNS LIST

1, 1A to 1K: heating device, 10, 10A: reference line, 10Aa, 10Ab, 10*a*, 10*a*-1, 10*a*-2, 10*b*, 10*c*: intersection point, 11, 11A: heating chamber, 11*a*: bottom face, 11*b*: top face, 11*c*: side face, 11*d*: heating chamber door, 12*a* to 12*d*: connection line, 21, 21*a* to 21*h*: microwave radiation element, 22: microwave radiation element pattern, 23: feeding pin, 24: short-circuit pin, 31: object to be heated, 41: power generation device, 42: power distribution circuit.

The invention claimed is:

1. A heating device comprising:

a heating chamber in which an object to be heated is housed;

a power generator generating microwave power;

a power distribution circuit distributing the microwave power generated by the power generator into a plurality of microwave powers; and a plurality of pairs of microwave radiators arranged on at least one plane orthogonal to a reference line set in the heating chamber, the plurality of pairs of microwave radiators each including two microwave radiators being arranged on opposite sides with respect to an intersection point between the reference line and the at least one plane, wherein the power distribution circuit distributes the plurality of microwave powers to a plurality of microwave radiators included in the plurality of pairs of microwave radiators by setting a phase difference of an angle obtained by dividing 360° by the number of the plurality of the microwave radiators clockwise or counterclockwise in turn around the reference line.

2. The heating device according to claim 1, wherein the two microwave radiators constituting each of a plurality of the pairs of microwave radiators are arranged at positions equidistant from the intersection point.

3. The heating device according to claim 1, wherein the plurality of pairs of microwave radiators are arranged rotationally symmetrically around the reference line.

4. The heating device according to claim 1, wherein the power distribution circuit distributes the microwave power with a phase difference of 180° to the two microwave radiators constituting each of the plurality of pairs of microwave radiators.

* * * * *